US008623962B2

(12) United States Patent
Hagadorn et al.

(10) Patent No.: US 8,623,962 B2
(45) Date of Patent: *Jan. 7, 2014

(54) OLEFIN FUNCTIONALIZATION BY METATHESIS REACTION

(71) Applicant: ExxonMobil Chemical Patents Inc., Baytown, TX (US)

(72) Inventors: John R. Hagadorn, Houston, TX (US); Matthew W. Holtcamp, Huffman, TX (US); Andrew G. Narvaez, Jr., League City, TX (US); Donna J. Crowther, Seabrook, TX (US); Patrick Brant, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/624,041

(22) Filed: Sep. 21, 2012

(65) Prior Publication Data

US 2013/0030126 A1 Jan. 31, 2013

Related U.S. Application Data

(60) Division of application No. 12/488,093, filed on Jun. 19, 2009, now Pat. No. 8,283,419, which is a continuation-in-part of application No. 12/143,663, filed on Jun. 20, 2008, now Pat. No. 8,372,930.

(51) Int. Cl.
*C08F 255/00* (2006.01)
*C08F 255/02* (2006.01)
*C08F 210/06* (2006.01)
*C08F 110/06* (2006.01)

(52) U.S. Cl.
USPC ........... 525/245; 525/242; 525/244; 525/285; 525/284; 525/296; 525/293; 525/301; 525/302; 525/333.7; 525/416; 525/384; 525/386; 526/348; 526/351

(58) Field of Classification Search
USPC ................. 525/245, 242, 244, 285, 301, 302; 526/348, 351
See application file for complete search history.

(56) References Cited

U.S. PATENT DOCUMENTS

| 3,235,484 A | 2/1966 | Colfer |
|---|---|---|
| 4,069,023 A | 1/1978 | Brois et al. |
| 4,110,377 A | 8/1978 | Clerici et al. |
| 4,197,398 A | 4/1980 | Floyd et al. |
| 4,619,756 A | 10/1986 | Dickakian |
| 4,973,414 A | 11/1990 | Nerger et al. |
| 5,026,948 A | 6/1991 | Forbus |
| 5,211,834 A | 5/1993 | Forester |
| 5,229,022 A | 7/1993 | Song et al. |
| 5,252,677 A | 10/1993 | Tomita et al. |
| 5,266,186 A | 11/1993 | Kaplan |
| 5,382,634 A | 1/1995 | Koyama et al. |
| 5,439,607 A | 8/1995 | Patil |
| 5,741,946 A | 4/1998 | Wei |
| 5,744,541 A | 4/1998 | Sawaguchi et al. |
| 5,750,815 A | 5/1998 | Grubbs et al. |
| 5,756,428 A | 5/1998 | Emert et al. |
| 6,017,859 A | 1/2000 | Rossi et al. |
| 6,114,445 A | 9/2000 | Tzoganakis et al. |
| 6,117,962 A | 9/2000 | Weng et al. |
| 6,143,686 A | 11/2000 | Vizzini et al. |
| 6,197,910 B1 | 3/2001 | Weng et al. |
| 6,225,432 B1 | 5/2001 | Weng et al. |
| 6,268,518 B1 | 7/2001 | Resconi et al. |
| 6,410,666 B1 | 6/2002 | Grubbs et al. |
| 6,444,773 B1 | 9/2002 | Markel |
| 6,448,350 B1 | 9/2002 | Dall'Occo et al. |
| 6,476,167 B2 | 11/2002 | Peters |
| 6,703,457 B2 | 3/2004 | Van Baar et al. |
| 6,750,307 B2 | 6/2004 | Weng et al. |
| 6,897,261 B1 | 5/2005 | Machida et al. |

(Continued)

FOREIGN PATENT DOCUMENTS

| CN | 101011062 | 8/2007 |
|---|---|---|
| EP | 0 767 182 | 4/1997 |

(Continued)

OTHER PUBLICATIONS

Watanabe, Masami, JP 05-320260 (Dec. 1993) abstract and translation in English.*
Mathers, R.T.; Coates, G.W. Chem. Commun., 2004, 422-423.*
Balboni et al., *$C_2$-Symmetric Zirconocenes for High Molecular Weight Amorphous Poly(propylene)*, Macromolecular Chemistry and Physics, 2001, vol. 202, No. 10, pp. 2010-2028.
Britovsek et al., *Iron and Cobalt Ethylene Polymerization Catalysts Bearing 2, 6-Bis(Imino)Pyridyl Ligands: Synthesis, Structures, and Polymerization Studies*, Journal of the American Chemical Society, 1999, vol. 121, No. 38, pp. 8728-8740.
Brzezinska et al., *Synthesis of ABA Triblock Copolymers via Acyclic Diene Metathesis Polymerization and Living Polymerization of α-Amino Acid-N-Carboxyanhydrides*, Macromolecules, 2001, vol. 34, pp. 4348-4354.

(Continued)

*Primary Examiner* — Rip A. Lee
(74) *Attorney, Agent, or Firm* — Kevin M. Faulkner; Catherine L. Bell

(57) ABSTRACT

This invention relates to a process to functionalize propylene co-oligomer comprising contacting an alkene metathesis catalyst with a heteroatom containing alkene, and a propylene a co-oligomer having an Mn of 300 to 30,000 g/mol comprising 10 to 90 mol % propylene and 10 to 90 mol % of ethylene, wherein the oligomer has at least X % allyl chain ends, where:
1) X=(−0.94 (mol % ethylene incorporated)+100), when 10 to 60 mol % ethylene is present in the co-oligomer, and 2) X=45, when greater than 60 and less than 70 mol % ethylene is present in the co-oligomer, and 3) X=(1.83*(mol % ethylene incorporated)−83), when 70 to 90 mol % ethylene is present in the co-oligomer. This invention also relates to a process to functionalize propylene homo-oligomer comprising contacting an alkene metathesis catalyst with a heteroatom containing alkene, and a propylene homo-oligomer, comprising propylene, wherein the oligomer has: at least 93% allyl chain ends, an Mn of about 500 to about 20,000 g/mol, an isobutyl chain end to allylic vinyl group ratio of 0.8:1 to 1.2:1.0, and less than 100 ppm aluminum.

26 Claims, No Drawings

(56) References Cited

U.S. PATENT DOCUMENTS

| | | |
|---|---|---|
| 6,939,930 B2 | 9/2005 | Reinking et al. |
| 7,126,031 B2 | 10/2006 | Boussie et al. |
| 7,247,385 B1 | 7/2007 | Tzoganakis et al. |
| 7,276,567 B2 | 10/2007 | Voskoboynikov et al. |
| 7,589,160 B2 | 9/2009 | Resconi et al. |
| 7,820,607 B2 | 10/2010 | Matsuda et al. |
| 7,943,716 B2 | 5/2011 | Resconi et al. |
| 7,960,487 B2 | 6/2011 | Yang et al. |
| 8,058,351 B2 | 11/2011 | Pawlow et al. |
| 8,283,419 B2 * | 10/2012 | Hagadorn et al. ............ 525/245 |
| 2002/0137978 A1 | 9/2002 | Grubbs et al. |
| 2003/0161752 A1 | 8/2003 | Luk et al. |
| 2004/0127649 A1 | 7/2004 | Arjunan et al. |
| 2004/0214953 A1 | 10/2004 | Yamada et al. |
| 2004/0249046 A1 | 12/2004 | Abhari et al. |
| 2005/0054793 A1 | 3/2005 | Reinking et al. |
| 2005/0159299 A1 | 7/2005 | Rodriguez et al. |
| 2005/0261440 A1 | 11/2005 | Dickakian et al. |
| 2006/0052553 A1 | 3/2006 | Resconi et al. |
| 2006/0270814 A1 | 11/2006 | Makio et al. |
| 2007/0293640 A1 | 12/2007 | Jiang et al. |
| 2008/0228017 A1 | 9/2008 | Burdett et al. |
| 2008/0234451 A1 | 9/2008 | Kenwright et al. |
| 2009/0221750 A1 | 9/2009 | Tsunogae et al. |
| 2009/0247441 A1 | 10/2009 | Baum |
| 2009/0318640 A1 | 12/2009 | Brant et al. |
| 2009/0318644 A1 | 12/2009 | Brant et al. |
| 2009/0318646 A1 | 12/2009 | Brant et al. |
| 2009/0318647 A1 | 12/2009 | Hagadorn et al. |
| 2010/0069573 A1 | 3/2010 | Arriola et al. |
| 2010/0152387 A1 | 6/2010 | Steininger et al. |
| 2010/0152388 A1 | 6/2010 | Jiang et al. |

FOREIGN PATENT DOCUMENTS

| | | | |
|---|---|---|---|
| EP | 0 802 216 | 10/1997 | |
| EP | 0 958 309 | 11/1999 | |
| EP | 1 361 232 | 11/2003 | |
| EP | 1 849 757 | 10/2007 | |
| EP | 1 862 491 | 12/2007 | |
| GB | 1 310 847 | 3/1973 | |
| JP | 02-064115 | 3/1990 | |
| JP | 05-320260 | 3/1993 | |
| JP | 05-320260 A * | 12/1993 | ............ C08F 210/16 |
| JP | 2000/038420 | 2/2000 | |
| JP | 2005/139284 | 6/2005 | |
| JP | 2005/336092 | 12/2005 | |
| JP | 2007/169340 | 7/2007 | |
| JP | 2007/246433 | 9/2007 | |
| JP | 2008/050278 | 3/2008 | |
| JP | 2010/037555 | 2/2010 | |
| JP | 2011/026448 | 2/2011 | |
| JP | 2012/051859 | 3/2012 | |
| JP | 2012/052062 | 3/2012 | |
| WO | WO 95/27717 | 10/1995 | |
| WO | WO 97/47665 | 12/1997 | |
| WO | WO 99/05182 | 2/1999 | |
| WO | WO 99/46270 | 9/1999 | |
| WO | WO 00/00576 | 1/2000 | |
| WO | WO 00/55218 | 9/2000 | |
| WO | WO 02/079127 | 10/2002 | |
| WO | WO 2004/031250 | 4/2004 | |
| WO | WO 2005/092935 | 10/2005 | |
| WO | WO 2006/127483 | 11/2006 | |
| WO | WO 2007/003238 | 1/2007 | |
| WO | WO 2008/027268 | 3/2008 | |
| WO | WO 2008/141941 | 11/2008 | |
| WO | WO 2009/009158 | 1/2009 | |
| WO | WO 2009/155517 | 12/2009 | |

OTHER PUBLICATIONS

Bujadoux et al., *Use of bridged and non-bridged metallocene catalysts in high pressure/high temperature ethylene/α-olefin copolymerization*, Metallocene Polymers, 1995, pp. 377-402.

Corey et al., "*Reactions of Hydrosilanes and Olefins in the Presence of $Cp_2MCl_2/nBuLi$*", Organometallics, 1992, vol. 11, pp. 672-683.

Hansell et al., *Additive-Free Clicking for Polymer Functionalization and Coupling by Tetrazine-Norbornene Chemistry*, Journal of the American Chemical Society, 2011, vol. 133, No. 35, pp. 13828-13831.

Herzon et al., "*Direct, Catalytic Hydroaminoalkylation of Unactivated Olefins with N-Alkyl Arylamines*", JACS, 2007, vol. 129, pp. 6690-6691.

Herzon et al., "*Hydroaminoalkylation of Unactivated Olefins with Dialkylamines*", JACS, 2007, vol. 130, pp. 14940-14941.

Kesti et al., "*Group 4 Metallocene Olefin Hydrosilyation Catalysts*", Organometallics, 1992, vol. 11, pp. 1095-1103.

Koo et al., "*Silicon-Modified Ziegler-Natta Polymerization. Catalytic Approaches to Silyl-Capped and Silyl-Linked Polyolefins Using "Single-Site" Cationic Ziegler-Natta Catalysts*", Journal of American Chemical Society, 1999, vol. 121, pp. 8791-8802.

Liu et al., *Kinetics of Initiation, Propagation, and Termination for the [rac-(C2H4(1-indenyl)2)ZrMe]{MeB(C6F5)3}-Catalyzed Polymerization of 1-Hexene*, Journal of the American Chemical Society, 2001, vol. 123, pp. 11193-11207.

Nagai et al., *Novel Well-defined Funcationalized Polyolefins and Polyolefin-polar Polymer Block Copolymers: Formations and Their Features*, Poly Preprints, 2008, vol. 49, No. 2, 776-777.

Nakatsuka et al., *Creation and Application of New Materials by a Fusion of FI-catalyst Technology and Fine Organic Synthesis Technology*, Shokubai, 2010, vol. 52, No. 8, pp. 569-574.

Passaglia et al., "*Grafting of Diethyl Maleate and Maleic Anhydride Onto Styrene-b-(Ethylene-co-1-Butene)-b-Styrene Triblock Copolymer (SEBS)*", Polymer, 2000, vol. 41, pp. 4389-4400.

Quirk et al., "*Anionic Synthesis of Secondary Amine Functionalized Polymers by Reaction of Polymeric Organolithiums with N-Benzylidenemethylamine*", Macromolecular Chemistry and Physics, 2002, vol. 203, pp. 1178-1187.

Rodriguez et al., *Poly(4-vinylpyridazine). First Synthesis, Characterization and Properties*, Polymeric Materials Science and Engineering, Proceedings of the ACS Division of Polymeric Materials Science and Engineering, 1990, vol. 63, pp. 376-382 (Abstract).

Rybak et al., "*Acyclic Diene Metathesis with a Monomer with a Monomer from Renewable Resources: Control of Molecular Weight and One-Step Preparation of Block Copolymers*", ChemSusChem, 2008, vol. 1, pp. 542-547.

Weng et al., Long Chain Branched Isotactic Polypropylene, Macromolecules, 2002, vol. 35, pp. 3838-3843.

Wu et al., *Synthesis of Polynorbornene-poly(ethylene-co-propylene) Diblock Copolymers*, Polymeric Materials Science and Engineering, 1998, vol. 78, pp. 158-159.

Xu et al., *Ethylene Copolymerization with 1-Octene Using a 2-Methylbenz[e] indenyl-Based ansa-Monocyclopentadienylamido Complex and Methylaluminoxane Catalyst*, Macromolecules, 1998, vol. 31, pp. 4724-4729.

Amin et al., *Versatile Pathways for In Situ Polyolefin Functionalization with Heteroatoms: Catalytic Chain Transfer*, Angew. Chem. Int. Ed., 2008, vol. 47, No. 11, pp. 2006-2025.

Britovsek et al., *Novel Olefin Polymerization Catalysts Based on Iron and Cobalt*, Chemical Communications, 1998, No. 7, pp. 849-850.

Chen et al., Reactive & Functional Polymers, 2008, vol. 68, No. 9, pp. 1307-1313.

Cossy et al., "*Cross-Metathesis reaction. Generation of Highly Functionalized Olefins from Unsaturated Alcohols*", Journal of Organometallic Chemistry, 2001, vol. 634, Issue 2, pp. 216-221.

Kolodka et al., "*Copolymerization of Propylene with Poly(Ethylene-Co-Propylene) Macromonomer and Branch Chain-Length Dependence of Rheological Properties*", Macromolecules, 2002, vol. 35, pp. 10062-10070.

Markel, et al., "*Metallocene-Based Branch-Block Thermoplastic Elastomers*", Macromolecules, 2000, vol. 33, pp. 8541-8548.

Mathers et al., *Cross Metathesis Functionalization of Polyolefins*, Chemical Communications—Chemcom, Royal Society of Chemistry, 2004, No. 4, pp. 422-423.

Ornelas et al., *Cross Olefin Metathesis for the Selective Functionalization, Ferrocenylation, and Solubilization in Water of*

(56) References Cited

OTHER PUBLICATIONS

*Olefin-Terminated Dendrimers, Polymers, and Gold Nanoparticles and for a Divergent Dendrimer Constructions*, Journal of American Chemical Soc., 2008, vol. 130, No. 4, pp. 1495-1506.

Resconi et al., *Chain Transfer Reactions in Propylene Polymerization with Zirconocene Catalysts*, Topics in Catalysis, 1999, vol. 7, No. 1-4, pp. 145-163.

Rose et al., "*Poly(ethylene-co-propylene macromonomer)s: Synthesis and Evidence for Starlike Conformaitons in Dilute Solution*", Macromolecules, 2008, vol. 41, pp. 559-567.

Shiono et al., *Copolymerization of poly(propylene) macromonomer with ethylene by (tert-butanamide)dimethyl(tetramethyl-qscyclopentadienyl) silane titanium dichloride/methylaluminoxane catalyst*, Macromol. Chem. Phys., 1997, vol. 198, pp. 3229-3237.

Weng et al., *Synthesis of Long-Chain Branched Propylene Polymers via Macromonomer Incorporation*, Macromol. Rapid Commun., 2001, vol. 22, No. 18, pp. 1488-1492.

Weng et al., Synthesis of Vinyl-Terminated Isotactic Poly(propylene), Macromol. Rapid Commun., 2000, 21, No. 16, pp. 1103-1107.

\* cited by examiner

OLEFIN FUNCTIONALIZATION BY METATHESIS REACTION

PRIORITY CLAIM

This application is a divisional of U.S. Pat. No. 8,283,419, which is a continuation in part of U.S. Pat. No. 8,372,930, which is incorporated by reference herein.

STATEMENT OF RELATED CASES

This application is also related to U.S. Ser. No. 12/487,739, filed Jun. 19, 2009.

FIELD OF THE INVENTION

This invention relates to functionalization of vinyl terminated polyolefins by metathesis reactions.

BACKGROUND OF THE INVENTION

Metathesis is generally thought of as the interchange of radicals between two compounds during a chemical reaction. There are several varieties of metathesis reactions, such as ring opening metathesis, acyclic diene metathesis, ring closing metathesis and cross metathesis. These reactions, however, have had limited success with the metathesis of functionalized olefins.

Methods for the production of polyolefins with end-functionalized groups are typically multi-step processes that often create unwanted by-products and waste of reactants and energy.

R. T. Mathers and G. W. Coates *Chem. Commun.* 2004, 422-423 disclose examples of using cross-metathesis to functionalize polyolefins containing pendant vinyl groups to form polar-functionalized products with a graft-type structure.

D. Astruc et al. *J. Am. Chem. Soc.* 2008, 130, 1495-1506, and D. Astruc et al. *Angew. Chem. Int. Ed.* 2005, 44, 7399-7404 disclose examples of using cross metathesis to functionalize non-polymeric molecules containing vinyl groups.

For reviews of methods to form end-functionalized polyolefins, see: (a) S. B. Amin and T. J. Marks *Angew. Chem. Int. Ed.* 2008, 47, 2006-2025; (b) T. C. Chung *Prog. Polym. Sci.* 2002, 27, 39-85; (c) R. G. Lopez, F. D'Agosto, C. Boisson *Prog. Polym. Sci.* 2007, 32, 419-454.

U.S. Ser. No. 12/487,739, filed Jun. 19, 2009 discloses certain vinyl terminated oligomers and polymers that are functionalized for use in lubricant applications.

U.S. Ser. No. 12/143,663, filed on Jun. 20, 2008 discloses certain vinyl terminated oligomers and polymers that are functionalized in U.S. Ser. No. 12/487,739, filed Jun. 19, 2009.

Additional references of interest include: U.S. Pat. No. 4,988,764.

Thus, there is a need to develop a means to provide functionalized polyolefins (particularly end-functionalized) by metathesis reactions, particularly reactions with good conversion, preferably under mild reaction conditions is a minimal number of steps. There is also a need for a single reaction type that allows for a variety of functional groups to be added to polyolefins in an economical manner. The instant invention's use of olefin alkene metathesis to introduce functional groups is both a commercially economical and an "atom-economical" route to end functionalized polyolefins.

This invention further provides vinyl-terminated polyolefins that react with functionalized alkenes in the presence of a metathesis catalyst to form polar end-functionalized polyolefins.

End-functionalized polyolefins that feature a chemically reactive or polar end group are of interest for use in a broad range of applications as compatibilizers, tie-layer modifiers, surfactants, and surface modifiers. Herein is described a novel method for their production by the metathesis of vinyl-terminated polyolefins with functionalized alkenes. This method is useful in a range of polyolefins, including isotactic polypropylene (iPP), atactic polypropylene (aPP), ethylene propylene copolymer (EP), and polyethylene (PE).

SUMMARY OF THE INVENTION

This invention relates to a process to functionalize polyolefins (as used herein polyolefin is defined to include both polymers and oligomers) comprising contacting an alkene metathesis catalyst with a heteroatom containing alkene, and one or more vinyl terminated polyolefins, preferably the vinyl terminated polyolefin comprise one or more of:

a) a propylene co-oligomer having an Mn of 300 to 30,000 g/mol (as measured by $^1$H NMR) comprising 10 to 90 mol % propylene and 10 to 90 mol % of ethylene, wherein the oligomer has at least X % allyl chain ends (relative to total unsaturations), where: 1) X=(−0.94 (mol % ethylene incorporated)+100), when 10 to 60 mol % ethylene is present in the co-oligomer, and 2) X=45, when greater than 60 and less than 70 mol % ethylene is present in the co-oligomer, and 3) X=(1.83*(mol % ethylene incorporated)−83), when 70 to 90 mol % ethylene is present in the co-oligomer; and/or b) a propylene oligomer, comprising more than 90 mol % propylene and less than 10 mol % ethylene, wherein the oligomer has: at least 93% allyl chain ends, an Mn of about 500 to about 20,000 g/mol (as measured by $^1$H NMR), an isobutyl chain end to allylic vinyl group ratio of 0.8:1 to 1.35:1.0, and less than 1400 ppm aluminum; and/or c) a propylene oligomer, comprising at least 50 mol % propylene and from 10 to 50 mol % ethylene, wherein the oligomer has: at least 90% allyl chain ends, Mn of about 150 to about 10,000 g/mol (as measured by $^1$H NMR), and an isobutyl chain end to allylic vinyl group ratio of 0.8:1 to 1.3:1.0, wherein monomers having four or more carbon atoms are present at from 0 to 3 mol %; and/or d) a propylene oligomer, comprising at least 50 mol % propylene, from 0.1 to 45 mol % ethylene, and from 0.1 to 5 mol % C4 to C12 olefin, wherein the oligomer has: at least 87% allyl chain ends (alternately at least 90%), an Mn of about 150 to about 10,000 g/mol, (as measured by $^1$H NMR), and an isobutyl chain end to allylic vinyl group ratio of 0.8:1 to 1.35:1.0; and/or e) a propylene oligomer, comprising at least 50 mol % propylene, from 0.1 to 45 wt % ethylene, and from 0.1 to 5 mol % diene, wherein the oligomer has: at least 90% allyl chain ends, an Mn of about 150 to about 10,000 g/mol (as measured by $^1$H NMR), and an isobutyl chain end to allylic vinyl group ratio of 0.7:1 to 1.35:1.0; and/or f) a homooligomer, comprising propylene, wherein the oligomer has: at least 93% allyl chain ends, an Mn of about 500 to about 20,000 g/mol (as measured by $^1$H NMR), an isobutyl chain end to allylic vinyl group ratio of 0.8:1 to 1.2:1.0, and less than 1400 ppm aluminum.

DETAILED DESCRIPTION

This invention relates to a process to functionalize vinyl terminated polyolefin comprising contacting an alkene metathesis catalyst with a heteroatom containing alkene, and one or more vinyl terminated oligomers or polymers, preferably comprising one or more of the vinyl terminated oligomers described herein.

The reactants are typically combined in a reaction vessel at a temperature of 20 to 200° C. (preferably 50 to 160° C., preferably 60 to 140° C.) and a pressure of 0 to 1000 MPa (preferably 0.5 to 500 MPa, preferably 1 to 250 MPa) for a residence time of 0.5 seconds to 10 hours (preferably 1 second to 5 hours, preferably 1 minute to 1 hour).

Typically, from about 0.7 to about 4.0 (e.g., 0.8 to 2.6), preferably from about 1.0 to about 2.0, and most preferably from about 1.1 to about 1.7 moles of the heteroatom containing alkene reactant are charged to the reactor per mole of polyolefin charged.

Typically, 0.00001 to 0.1 moles, preferably 0.0001 to 0.02 moles, preferably 0.0005 to 0.01 moles of catalyst are charged to the reactor per mole of polyolefin charged.

The process is typically a solution process, although it may be a bulk or high pressure process. Homogeneous processes are preferred. (A homogeneous process is defined to be a process where at least 90 wt % of the product is soluble in the reaction media.) A bulk homogeneous process is particularly preferred. (A bulk process is defined to be a process where reactant concentration in all feeds to the reactor is 70 volume % or more.) Alternately no solvent or diluent is present or added in the reaction medium, (except for the small amounts used as the carrier for the catalyst or other additives, or amounts typically found with the reactants; e.g. propane in propylene).

Suitable diluents/solvents for the process include non-coordinating, inert liquids. Examples include straight and branched-chain hydrocarbons such as isobutane, butane, pentane, isopentane, hexanes, isohexane, heptane, octane, dodecane, and mixtures thereof; cyclic and alicyclic hydrocarbons such as cyclohexane, cycloheptane, methylcyclohexane, methylcycloheptane, and mixtures thereof such as can be found commercially (Isopar™); perhalogenated hydrocarbons such as perfluorinated $C_{4-10}$ alkanes, chlorobenzene, and aromatic and alkyl substituted aromatic compounds such as benzene, toluene, mesitylene, and xylene. In a preferred embodiment, the feed concentration for the process is 60 volume % solvent or less, preferably 40 volume % or less, preferably 20 volume % or less.

The process may be batch, semi-batch or continuous. As used herein, the term continuous means a system that operates without interruption or cessation. For example, a continuous process to produce a polymer would be one where the reactants are continually introduced into one or more reactors and polymer product is continually withdrawn.

Useful reaction vessels include reactors (including continuous stirred tank reactors, batch reactors, reactive extruder, pipe or pump.

In a preferred embodiment, the productivity of the process is at least 200 g of polar end-functionalized polyolefin per mmol of catalyst per hour, preferably at least 5000 g/mmol/hour, preferably at least 10,000 g/mmol/hr, preferably at least 300,000 g/mmol/hr.

This invention further relates to a process, preferably an in-line process, preferably a continuous process, to produce functionalized polyolefin, comprising introducing monomer and catalyst system into a reactor, obtaining a reactor effluent containing vinyl terminated polyolefin, optionally removing (such as flashing off) solvent, unused monomer and/or other volatiles, obtaining vinyl terminated polyolefin (such as those described herein), introducing vinyl terminated polyolefin, alkene metathesis catalyst and heteroatom containing alkene (as described herein) into a reaction zone (such as a reactor, an extruder, a pipe and/or a pump) and obtaining functionalized polyolefin (such as those described herein).

Alkene Metathesis Catalysts

An alkene metathesis catalyst is a compound that catalyzes the reaction between a vinyl terminated oligomer (or polymer) with a heteroatom containing alkene to produce a heteroatom functionalized oligomer (or polymer), typically with the elimination of ethylene.

In a preferred embodiment, the alkene metathesis catalyst is represented by the Formula (I):

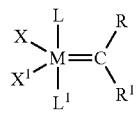

Formula (I)

where:

M is a Group 8 metal, preferably Ru or Os, preferably Ru;

X and $X^1$ are, independently, any anionic ligand, preferably a halogen (preferably Cl), an alkoxide or a triflate, or X and $X^1$ may be joined to form a dianionic group and may form single ring of up to 30 non-hydrogen atoms or a multinuclear ring system of up to 30 non-hydrogen atoms;

L and $L^1$ are, independently, a neutral two electron donor, preferably a phosphine or a N-heterocyclic carbene, L and $L^1$ may be joined to form a single ring of up to 30 non-hydrogen atoms or a multinuclear ring system of up to 30 non-hydrogen atoms;

L and X may be joined to form a multidentate monoanionic group and may form single ring of up to 30 non-hydrogen atoms or a multinuclear ring system of up to 30 non-hydrogen atoms;

$L^1$ and $X^1$ may be joined to form a multidentate monoanionic group and may form single ring of up to 30 non-hydrogen atoms or a multinuclear ring system of up to 30 non-hydrogen atoms;

R and $R^1$ are, independently, hydrogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl);

$R^1$ and $L^1$ or $X^1$ may be joined to form single ring of up to 30 non-hydrogen atoms or a multinuclear ring system of up to 30 non-hydrogen atoms; and R and L or X may be joined to form single ring of up to 30 non-hydrogen atoms or a multinuclear ring system of up to 30 non-hydrogen atoms.

For purposes of this invention and claims thereto a substituted hydrocarbyl is a radical made of carbon and hydrogen where at least one hydrogen is replaced by a heteroatom. For purposes of this invention and claims thereto a substituted alkyl or aryl group is a radical made of carbon and hydrogen where at least one hydrogen is replaced by a heteroatom or a linear, branched, or cyclic substituted or unsubstituted hydrocarbyl group having 1 to 30 carbon atoms.

Preferred alkoxides include those where the alkyl group is a phenol, substituted phenol (where the phenol may be substituted with up to 1, 2, 3, 4 or 5 $C_1$ to $C_{12}$ hydrocarbyl groups) or a $C_1$ to $C_{10}$ hydrocarbyl, preferably a $C_1$ to $C_{10}$ alkyl group, preferably methyl, ethyl, propyl, butyl, or phenyl.

Preferred triflates are represented by the Formula (II):

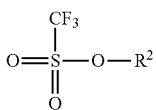

Formula (II)

where $R^2$ is hydrogen or a $C_1$ to $C_{30}$ hydrocarbyl group, preferably a $C_1$ to $C_{12}$ alkyl group, preferably methyl, ethyl, propyl, butyl, or phenyl.

Preferred N-heterocyclic carbenes are represented by the Formula (III) or the Formula (IV):

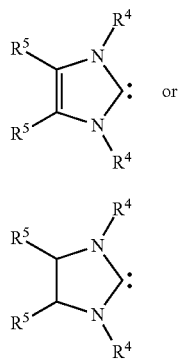

Formula (III)

or

Formula (IV)

where
each $R^4$ is independently a hydrocarbyl group or substituted hydrocarbyl group having 1 to 40 carbon atoms, preferably methyl, ethyl, propyl, butyl (including isobutyl and n-butyl), pentyl, cyclopentyl, hexyl, cyclohexyl, octyl, cyclooctyl, nonyl, decyl, cyclodecyl, dodecyl, cyclododecyl, mesityl, adamantyl, phenyl, benzyl, toluoyl, chlorophenyl, phenol, substituted phenol, or $CH_2C(CH_3)_3$; and
each $R^5$ is hydrogen, a halogen, or a $C_1$ to $C_{12}$ hydrocarbyl group, preferably hydrogen, bromine, chlorine, methyl, ethyl, propyl, butyl, or phenyl.

In other useful embodiments, one of the N groups bound to the carbene in formula (III) or (IV) is replaced with an S, O or P atom, preferably an S atom.

Other useful N-heterocyclic carbenes include the compounds described in Hermann, W. A. Chem. Eur. J. 1996, 2, 772 and 1627; Enders, D. et al. Angew. Chem. Int. Ed. 1995, 34, 1021; Alder R. W., Angew. Chem. Int. Ed. 1996, 35, 1121; and Bertrand, G. et al. Chem. Rev. 2000, 100, 39.

In a preferred embodiment, the alkene metathesis catalyst is one or more of tricyclohexylphosphine[1,3-bis(2,4,6-trimethylphenyl)imidazol-2-ylidene][3-phenyl-1H-inden-1-ylidene]ruthenium(II)dichloride, tricyclohexylphosphine[3-phenyl-1H-inden-1-ylidene][1,3-bis(2,4,6-trimethylphenyl)-4,5-dihydro-imidazol-2-ylidene]ruthenium(II)dichloride, tricyclohexylphosphine[1,3-bis(2,4,6-trimethylphenyl)-4,5-dihydroimidazol-2-ylidene][(phenylthio)methylene]ruthenium(II)dichloride, bis(tricyclohexylphosphine)-3-phenyl-1H-inden-1-ylideneruthenium(II)dichloride, 1,3-Bis(2,4,6-trimethylphenyl)-4,5-dihydroimidazol-2-ylidene[2-(1-propoxy)-5-(N,N-dimethylaminosulfonyl)phenyl]methyleneruthenium(II)dichloride, and [1,3-Bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride.

In another embodiment, the alkene metathesis catalyst is represented in Formula (I) above, where: M is Os or Ru; $R^1$ is hydrogen; X and $X^1$ may be different or the same and are any anionic ligand; L and $L^1$ may be different or the same and are any neutral electron donor; and R may be hydrogen, substituted or unsubstituted alkyl, or substituted or unsubstituted aryl. R is preferably hydrogen, $C_1$-$C_{20}$ alkyl, or aryl. The $C_1$-$C_{20}$ alkyl may optionally be substituted with one or more aryl, halide, hydroxy, $C_1$-$C_{20}$ alkoxy, or $C_2$-$C_{20}$ alkoxycarbonyl groups. The aryl may optionally be substituted with one or more $C_1$-$C_{20}$ alkyl, aryl, hydroxyl, $C_1$-$C_5$ alkoxy, amino, nitro, or halide groups. L and $L^1$ are preferably phosphines of the formula $PR^{3'}R^{4'}R^{5'}$, where $R^{3'}$ is a secondary alkyl or cycloalkyl, and $R^{4'}$ and $R^{5'}$ are aryl, $C_1$-$C_{10}$ primary alkyl, secondary alkyl, or cycloalkyl. $R^{4'}$ and $R^{5'}$ may be the same or different. L and $L^1$ preferably the same and are —P(cyclohexyl)$_3$, —P(cyclopentyl)$_3$, or —P(isopropyl)$_3$. X and $X^1$ are most preferably the same and are chlorine.

In another embodiment of the present invention, the ruthenium and osmium carbene compounds have the Formula (V):

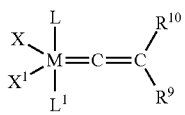

Formula (V)

where M is Os or Ru, preferably Ru; X, $X^1$, L and $L^1$ are as described above; and $R^9$ and $R^{10}$ may be different or the same and may be hydrogen, substituted or unsubstituted alkyl, or substituted or unsubstituted aryl. The $R^9$ and $R^{10}$ groups may optionally include one or more of the following functional groups: alcohol, thiol, ketone, aldehyde, ester, ether, amine, imine, amide, nitro, carboxylic acid, disulfide, carbonate, isocyanate, carbodiimide, carboalkoxy, and halogen groups. Such compounds and their synthesis are described in U.S. Pat. No. 6,111,121.

In another embodiment, the alkene metathesis catalyst useful herein may be any of the catalysts described in U.S. Pat. No. 6,111,121, U.S. Pat. No. 5,312,940, U.S. Pat. No. 5,342,909, U.S. Pat. No. 7,329,758, U.S. Pat. No. 5,831,108, U.S. Pat. No. 5,969,170, U.S. Pat. No. 6,759,537, U.S. Pat. No. 6,921,735, US 2005-0261451A1, including but not limited to, benzylidene-bis(tricyclohexylphosphine)dichlororuthenium, benzylidene[1,3-bis(2,4,6-trimethylphenyl)-2-imidazolidinylidene]dichloro(tricyclohexylphosphine)ruthenium, dichloro(o-isopropoxyphenylmethylene)(tricyclohexylphosphine)ruthenium(II), (1,3-Bis-(2,4,6-trimethylphenyl)-2-imidazolidinylidene)dichloro(o-isopropoxyphenylmethylene)ruthenium, 1,3-Bis(2-methylphenyl)-2-imidazolidinylidene)dichloro(2-isopropoxyphenylmethylene)ruthenium(II), [1,3-Bis(2,4,6-trimethylphenyl)-2-imidazolidinylidene]dichloro[3-(2-pyridinyl)propylidene]ruthenium(II), [1,3-Bis(2-methylphenyl)-2-imidazolidinylidene]dichloro(phenylmethylene) (tricyclohexylphosphine)ruthenium(II), [1,3-Bis(2,4,6-trimethylphenyl)-2-imidazolidinylidene] dichloro(3-methyl-2-butenylidene)(tricyclohexylphosphine) ruthenium(II), and [1,3-Bis(2,4,6-trimethylphenyl)-2-imidazolinylidene]dichloro(benzylidene)bis(3-bromopyridine) ruthenium(II).

In another embodiment, the Schrock type metathesis catalysts may be used herein as alkene metathesis catalysts. In another embodiment, the alkene metathesis catalyst useful herein may be any of the catalysts described in U.S. Pat. No. 6,346,652, U.S. Pat. No. 6,121,473, U.S. Pat. No. 5,142,073, U.S. Pat. No. 5,146,033, U.S. Pat. No. 5,087,710, WO 2008/066754, US 2008/0119678, US 2005/0154221, EP 1 056 756 B1, EP 1 501 784 A1, EP 0 509 034 A1, WO 2000/002834; WO 1999/042469, WO 1992/019631, WO1991/009825. Preferred examples include 2,6-Diisopropylphenylimidoneophylidene molybdenum(VI)bis(t-butoxide), 2,6-Diisopropylphenylimidoneophylidene molybdenum(VI)bis(hexafluoro-t-butoxide), 2,6-Diisopropylphenylimidoneophylidenemolybdenum(VI)bis(trifluoromethanesulfonate)dimethoxyethane adduct, and 2,6-Diisopropylphenylimidoneophylidene[racemic-BIPHEN]molybdenum(VI).

The above named catalysts are generally available for Sigma-Aldrich Corp. (St. Louis, Mo.) or Strem Chemicals, Inc. (Newburyport, Mass.).

Heteroatom Containing Alkenes

Heteroatom containing alkenes useful in the process described herein include those represented by the formula: $H_2C=CH-R$ or $R^*-HC=CH-R$, where $R^*$ and R are, independently, a heteroatom containing group, preferably containing from 1 to 30 carbon atoms and at least one heteroatom (preferably the heteroatom(s) are selected from the group consisting of Si, P, O, S, N, Cl, F, I and Br (preferably N, O, Cl and Br, preferably N and O). R and $R^*$ may contain 1, 2, 3, or 4 heteroatoms. In another embodiment, both R and $R^*$ contain at least one heteroatom. Heteroatom containing alkenes may include, one, two, three, four, five or six heteroatoms. Heteroatom containing alkenes may also include more than one unsaturation, preferably two, three, four, or five unsaturations, preferably as vinyl chain ends. For purposes of this invention and the claims thereto, a heteroatom is defined to be any non-carbon, non-hydrogen atom, preferably any group 13 to 17 element, excluding carbon.

Preferred R groups are selected from the group consisting of alcohols, amides, nitriles, imines, haloalkyls, acids, esters, anhydrides, acid-esters, oxycarbonyls, carbonyls, formyls, formylcarbonyls, hydroxyls, and acetyl halides.

Particularly preferred heteroatom containing alkenes include those represented by the formula: —C(O)—X, where the O is double bonded to the C and the X is hydrogen, nitrogen, hydroxy, oxyhydrocarbyl (e.g. ester), oxygen, the salt moiety —OM wherein M is a metal, e.g. alkali, alkaline earth, transition metal, copper, zinc and the like, oxy hetero, e.g. —O—Z wherein Z represents a heteroatom such as silicon, phosphorus, boron, sulfur, which heteroatom may be substituted with hydrocarbyl or oxyhydrocarbyl groups, or two acyl groups may be joined through (X).

Preferred R groups include alkyl amine groups, such as those represented by the formula: -D-N where D is a hydrocarbyl group having 1 to 12 carbon atoms, preferably ethyl, propyl, butyl, pentyl, hexyl, octyl, decy, dodeccyl.

Preferred R groups include alkyl nitrile groups, such as those represented by the formula: -D-C≡N where D is a hydrocarbyl group having 1 to 12 carbon atoms, preferably ethyl, propyl, butyl, pentyl, hexyl, octyl, decy, dodeccyl, and C is triple bonded to N.

Other preferred R groups include those represented by the formula: D-Y, where D is a hydrocarbyl group having 1 to 12 carbon atoms, preferably ethyl, propyl, butyl, pentyl, hexyl, octyl, decy, dodeccyl, and Y is N or O.

Preferred R groups include acyl groups derived from monounsaturated mono- or dicarboxylic acids and their derivatives, e.g. esters and salts.

In another embodiment, the R group is selected from the group consisting of (i) monounsaturated $C_4$ to $C_{10}$ dicarboxylic acid (preferably wherein (a) the carboxyl groups are vicinyl, (i.e. located on adjacent carbon atoms) and (b) at least one, preferably both, of said adjacent carbon atoms are part of said monounsaturation); (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated to the carboxyl group, i.e., of the structure —C=C—C(O)— (where O is double bonded to C), and (iv) derivatives of (iii) such as $C_1$ to $C_5$ alcohol derived monoesters of (iii).

Particularly preferred heteroatom containing alkenes include acrylonitrile, acrylamide, allyl amine, acrylic acid, crotonic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, crotonic acid, methylcrotonic acid, sorbic acid, 3-hexenoic acid, 10-decenoic acid, 2-pentene-1,3,5-tricarboxylic acid, cinnamic acid, and lower alkyl (e.g. $C_1$ to $C_4$ alkyl) acid esters of the foregoing, e.g. methyl maleate, ethyl fumarate, methyl fumarate, etc. Particularly preferred heteroatom containing alkenes include methyl acrylate, acrylic acid, and 5-hexen-1-ol.

The functionalized vinyl terminated oligomers described herein may be further derivatized as described in U.S. Pat. No. 6,022,929.

Vinyl Terminated Olefin Oligomers and Polymers

Vinyl terminated olefin oligomers and polymers useful in this invention include propylene homo-oligomers, comprising propylene and less than 0.5 wt % comonomer, preferably 0 wt % comonomer, wherein the oligomer has:

i) at least 93% allyl chain ends (preferably at least 95%, preferably at least 97%, preferably at least 98%);

ii) a number average molecular weight (Mn) of about 500 to about 20,000 g/mol, as measured by $^1$H NMR (preferably 500 to 15,000, preferably 700 to 10,000, preferably 800 to 8,000 g/mol, preferably 900 to 7,000, preferably 1000 to 6,000, preferably 1000 to 5,000);

iii) an isobutyl chain end to allylic vinyl group ratio of 0.8:1 to 1.3:1.0; and iv) less than 1400 ppm aluminum, (preferably less than 1200 ppm, preferably less than 1000 ppm, preferably less than 500 ppm, preferably less than 100 ppm).

Vinyl terminated olefin oligomers and polymers useful in this invention also include propylene co-oligomers having an Mn of 300 to 30,000 g/mol as measured by $^1$H NMR (preferably 400 to 20,000, preferably 500 to 15,000, preferably 600 to 12,000, preferably 800 to 10,000, preferably 900 to 8,000, preferably 900 to 7,000 g/mol), comprising 10 to 90 mol % propylene (preferably 15 to 85 mol %, preferably 20 to 80 mol %, preferably 30 to 75 mol %, preferably 50 to 90 mol %) and 10 to 90 mol % (preferably 85 to 15 mol %, preferably 20 to 80 mol %, preferably 25 to 70 mol %, preferably 10 to 50 mol %) of one or more alpha-olefin comonomers (preferably ethylene, butene, hexene, or octene, preferably ethylene), wherein the oligomer has at least X % allyl chain ends (relative to total unsaturations), where: 1) X=(−0.94 (mol % ethylene incorporated)+100 {alternately 1.20 (−0.94 (mol % ethylene incorporated)+100), alternately 1.50 (−0.94 (mol % ethylene incorporated)+100)}), when 10 to 60 mol % ethylene is present in the co-oligomer, and 2) X=45 (alternately 50, alternately 60), when greater than 60 and less than 70 mol % ethylene is present in the co-oligomer, and 3) X=(1.83*(mol % ethylene incorporated)−83, {alternately 1.20 [1.83*(mol % ethylene incorporated)−83], alternately 1.50 [1.83*(mol % ethylene incorporated)−83]}), when 70 to 90 mol % ethylene is present in the co-oligomer. Alternately X is 80% or more, preferably 85% or more, preferably 90% or more, preferably 95% or more. In an alternate embodiment the oligomer has at least 80% isobutyl chain ends (based upon the sum of isobutyl and n-propyl saturated chain ends), preferably at least 85% isobutyl chain ends, preferably at least 90% isobutyl chain ends. Alternately, the oligomer has an isobutyl chain end to allylic vinyl group ratio of 0.8:1 to 1.35:1.0, preferably 0.9:1 to 1.20:1.0, preferably 0.9:1.0 to 1.1:1.0.

Vinyl terminated olefin oligomers and polymers useful in this invention also include propylene oligomers, comprising more than 90 mol % propylene (preferably 95 to 99 mol %, preferably 98 to 9 mol %) and less than 10 mol % ethylene (preferably 1 to 4 mol %, preferably 1 to 2 mol %), wherein the oligomer has:
  i) at least 93% allyl chain ends (preferably at least 95%, preferably at least 97%, preferably at least 98%);
  ii) a number average molecular weight (Mn) of about 400 to about 30,000 g/mol, as measured by $^1$H NMR (preferably 500 to 20,000, preferably 600 to 15,000, preferably 700 to 10,000 g/mol, preferably 800 to 9,000, preferably 900 to 8,000, preferably 1000 to 6,000);
  iii) an isobutyl chain end to allylic vinyl group ratio of 0.8:1 to 1.35:1.0, and
  iv) less than 1400 ppm aluminum, (preferably less than 1200 ppm, preferably less than 1000 ppm, preferably less than 500 ppm, preferably less than 100 ppm).

Vinyl terminated olefin oligomers and polymers useful in this invention also include propylene oligomers, comprising: at least 50 (preferably 60 to 90, preferably 70 to 90) mol % propylene and from 10 to 50 (preferably 10 to 40, preferably 10 to 30) mol % ethylene, wherein the oligomer has:
  i) at least 90% allyl chain ends (preferably at least 91%, preferably at least 93%, preferably at least 95%, preferably at least 98%);
  ii) an Mn of about 150 to about 20,000 g/mol, as measured by $^1$H NMR (preferably 200 to 15,000, preferably 250 to 15,000, preferably 300 to 10,000, preferably 400 to 9,500, preferably 500 to 9,000, preferably 750 to 9,000); and
  iii) an isobutyl chain end to allylic vinyl group ratio of 0.8:1 to 1.3:1.0, wherein monomers having four or more carbon atoms are present at from 0 to 3 mol % (preferably at less than 1 mol %, preferably less than 0.5 mol %, preferably at 0 mol %).

Vinyl terminated olefin oligomers and polymers useful in this invention also include propylene oligomers, comprising: at least 50 (preferably at least 60, preferably 70 to 99.5, preferably 80 to 99, preferably 90 to 98.5) mol % propylene, from 0.1 to 45 (alternately at least 35, preferably 0.5 to 30, preferably 1 to 20, preferably 1.5 to 10) mol % ethylene, and from 0.1 to 5 (preferably 0.5 to 3, preferably 0.5 to 1) mol % $C_4$ to $C_{12}$ olefin (such as butene, hexene or octene, preferably butene), wherein the oligomer has:
  i) at least 90% allyl chain ends (preferably at least 91%, preferably at least 93%, preferably at least 95%, preferably at least 98%);
  ii) a number average molecular weight (Mn) of about 150 to about 15,000 g/mol, as measured by $^1$H NMR (preferably 200 to 12,000, preferably 250 to 10,000, preferably 300 to 10,000, preferably 400 to 9500, preferably 500 to 9,000, preferably 750 to 9,000); and
  iii) an isobutyl chain end to allylic vinyl group ratio of 0.8:1 to 1.35:1.0.

Vinyl terminated olefin oligomers and polymers useful in this invention also include propylene oligomers, comprising: at least 50 (preferably at least 60, preferably 70 to 99.5, preferably 80 to 99, preferably 90 to 98.5) mol % propylene, from 0.1 to 45 (alternately at least 35, preferably 0.5 to 30, preferably 1 to 20, preferably 1.5 to 10) mol % ethylene, and from 0.1 to 5 (preferably 0.5 to 3, preferably 0.5 to 1) mol % diene (such as C4 to C12 alpha-omega dienes (such as butadiene, hexadiene, octadiene), norbornene, ethylidene norbornene, vinylnorbornene, norbornadiene, and dicyclopentadiene), wherein the oligomer has:
  i) at least 90% allyl chain ends (preferably at least 91%, preferably at least 93%, preferably at least 95%, preferably at least 98%);
  ii) a number average molecular weight (Mn) of about 150 to about 20,000 g/mol, as measured by $^1$H NMR (preferably 200 to 15,000, preferably 250 to 12,000, preferably 300 to 10,000, preferably 400 to 9,500, preferably 500 to 9,000, preferably 750 to 9,000); and
  iii) an isobutyl chain end to allylic vinyl group ratio of 0.7:1 to 1.35:1.0.

Any of the oligomers described herein preferably have less than 1400 ppm aluminum, preferably less than 1000 ppm aluminum, preferably less than 500 ppm aluminum, preferably less than 100 ppm aluminum, preferably less than 50 ppm aluminum, preferably less than 20 ppm aluminum, preferably less than 5 ppm aluminum.

As used herein, the term "oligomer" is defined to have an Mn of from 100 to 25,000 g/mol as measured by $^1$H NMR. A polymer has an Mn of more than 25,000 g/mol. When an oligomer is referred to as comprising an olefin, the olefin present in the oligomer is the oligomerized form of the olefin. A propylene oligomer is an oligomer having at least 50 mol % of propylene. A co-oligomer is an oligomer comprising at least two different monomer units (such as propylene and ethylene). A homo-oligomer is an oligomer comprising units of the same monomer (such as propylene). As used herein, Mn is number average molecular weight (measured by $^1$H NMR unless stated otherwise), Mw is weight average molecular weight (measured by Gel Permeation Chromatography), and Mz is z average molecular weight (measured by Gel Permeation Chromatography), wt % is weight percent, and mol % is mole percent. Molecular weight distribution (MWD) is defined to be Mw (measured by Gel Permeation Chromatography) divided by Mn (measured by $^1$H NMR). Unless otherwise noted, all molecular weight units (e.g., Mw, Mn, Mz) are g/mol.

"Allyl chain ends" (also referred to as "vinyl termination" "vinyl chain ends" or "vinyl content") is defined to be an oligomer (polymer) having at least one terminus represented by formula I:

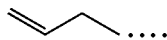

allylic vinyl end group where the "••••" represents the oligomer or polymer chain. In a preferred embodiment the allyl chain end is represented by the formula II:

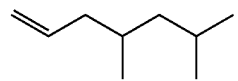

allylic vinyl end group

The amount of allyl chain ends is determined using $^1$H NMR at 120° C. using deuterated tetrachloroethane as the solvent on a 500 MHz machine. and in selected cases confirmed by $^{13}$C NMR. Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl terminated propylene oligomers in J American Chemical Soc 114 1992, 1025-1032 that are useful herein.

"Isobutyl chain end" is defined to be an oligomer or polymer having at least one terminus represented by the formula:

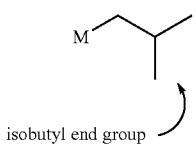

where M represents the oligomer or polymer chain. In a preferred embodiment, the isobutyl chain end is represented by one of the following formulae:

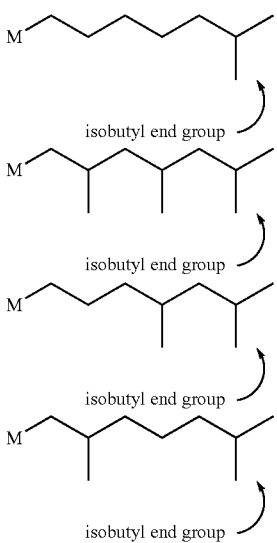

where M represents the oligomer or polymer chain.

The percentage of isobutyl end groups is determined using $^{13}$C NMR (as described in the example section) and the chemical shift assignments in Resconi et al, J. Am. Chem. Soc. 1992, 114, 1025-1032 for 100% propylene oligomers (and polymers) and set forth in Figure 2 for E-P oligomers (and polymers).

The "isobutyl chain end to allylic vinyl group ratio" is defined to be the ratio of the percentage of isobutyl chain ends to the percentage of allylic vinyl groups.

In a preferred embodiment, the propylene oligomer comprises less than 3 wt % of functional groups selected from hydroxide, aryls and substituted aryls, halogens, alkoxys, carboxylates, esters, acrylates, oxygen, nitrogen, and carboxyl, preferably less than 2 wt %, more preferably less than 1 wt %, more preferably less than 0.5 wt %, more preferably less than 0.1 wt %, more preferably 0 wt %, based upon the weight of the oligomer.

The oligomer preferably has an $M_n$ as determined by $^1$H NMR of 150 to 25,000 g/mole, 200 to 20,000 g/mol, preferably 250 to 15,000 g/mol, preferably 300 to 15,000 g/mol, preferably 400 to 12,000 g/mol, preferably 750 to 10,000 g/mol. Further, a desirable molecular weight range can be any combination of any upper molecular weight limit with any lower molecular weight limit described above. $M_n$ is determined according to the methods described below in the examples section.

The oligomer preferably has a glass transition temperature (Tg) of less than 0° C. or less (as determined by differential scanning calorimetry as described below), preferably –10° C. or less, more preferably –20° C. or less, more preferably –30° C. or less, more preferably –50° C. or less.

The oligomer preferably contains less than 80 wt % of $C_4$ olefin(s), (such as isobutylene n-butene, 2-butene, isobutylene, and butadiene), based upon the weight of the oligomer, preferably less than 10 wt %, preferably 5 wt %, preferably less than 4 wt %, preferably less than 3 wt %, preferably less than 2 wt %, preferably less than 1 wt %, preferably less than 0.5 wt %, preferably less than 0.25 wt % of $C_4$ olefin(s) based upon the weight of the oligomer.

Alternately, the oligomer preferably contains less than 20 wt % of $C_4$ or more olefin(s), (such as $C_4$ to $C_{30}$ olefins, typically such as $C_4$ to $C_{12}$ olefins, typically such as $C_4$, $C_6$, $C_8$, $C_{12}$, olefins, etc.), based upon the weight of the oligomer, preferably less than 10 wt %, preferably 5 wt %, preferably less than 4 wt %, preferably less than 3 wt %, preferably less than 2 wt %, preferably less than 1 wt %, preferably less than 0.5 wt %, preferably less than 0.25 wt % of $C_4$ olefin(s) based upon the weight of the oligomer, as determined by $^{13}$C NMR.

In another embodiment, the oligomer composition produced comprises at least 50 wt % (preferably at least 75 wt %, preferably at least 90 wt %, based upon the weight of the oligomer composition) olefins having at least 36 carbon atoms (preferably at least 51 carbon atoms, preferably at least 102 carbon atoms) as measured by $^1$H NMR assuming one unsaturation per chain.

In another embodiment, the oligomer composition produced comprises less than 20 wt % dimer and trimer (preferably less than 10 wt %, preferably less than 5 wt %, more preferably less than 2 wt %, based upon the weight of the oligomer composition), as measured by GC.

In another embodiment, the oligomer produced here contains less than 25 ppm hafnium, preferably less than 10 ppm hafnium, preferably less than 5 ppm hafnium based on the yield of polymer produced and the mass of catalyst employed.

In another embodiment, the oligomers described herein may have a melting point (DSC first melt) of from 60 to 130° C., alternately 50 to 100° C. In another embodiment, the oligomers described herein have no detectable melting point by DSC following storage at ambient temperature (23° C.) for at least 48 hours.

Melting temperature ($T_m$) and glass transition temperature (Tg) are measured using Differential Scanning calorimetry (DSC) using commercially available equipment such as a TA Instruments 2920 DSC. Typically, 6 to 10 mg of the sample, that has been stored at room temperature for at least 48 hours, is sealed in an aluminum pan and loaded into the instrument at room temperature. The sample is equilibrated at 25° C., then it is cooled at a cooling rate of 10° C./min to –80° C. The sample is held at –80° C. for 5 min and then heated at a heating rate of 10° C./min to 25° C. The glass transition temperature is measured from the heating cycle. Alternatively, the sample is equilibrated at 25° C., then heated at a heating rate of 10° C./min to 150° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

In another embodiment, the oligomers described herein are a liquid at 25° C.

In another embodiment, the oligomers described herein have an Mw (measured as described below) of 1,000 to about 30,000 g/mol, alternately 2000 to 25,000 g/mol, alternately 3,000 to 20,000 g/mol and/or an Mz of about 1700 to about 150,000 g/mol, alternately 800 to 100,000 g/mol.

Mw and Mz are measured by using a High Temperature Size Exclusion Chromatograph (either from Waters Corporation or Polymer Laboratories), equipped with a differential refractive index detector (DRI), Experimental details, are described in: T. Sun, P. Brant, R. R. Chance, and W. W. Graessley, Macromolecules, Volume 34, Number 19, 6812-6820, (2001) and references therein. Three Polymer Laboratories PLgel 10 mm Mixed-B columns are used. The nominal flow rate is 0.5 cm$^3$/min, and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 135° C. The injection concentration is from 1.0 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and 0.1 otherwise. Units on parameters throughout this description of the SEC method are such that concentration is expressed in g/cm$^3$, molecular weight is expressed in g/mole, and intrinsic viscosity is expressed in dL/g.

Molecular weight distribution (Mw/Mn—by GPC-DRI) is determined by the method above. In some embodiments, the oligomers of this invention have an Mw/Mn (by GPC-DRI) of 1.5 to 20, alternately 1.7 to 10.

In another embodiment, this invention can be practiced with any vinyl containing materials, preferably with vinyl terminated materials (including vinyl terminated polymers, vinyl terminated polyolefins (such as vinyl terminated ethylene homo- and co-polymers, and vinyl terminated propylene homo- and co-polymers)). Many of these materials are known in the art and can be functionalized using the processes described herein, e.g. contacting an alkene metathesis catalyst (as described herein) with a heteroatom containing alkene (as described herein) and one or more vinyl containing materials. Vinyl terminated polymers include homo- and co-polymers of heteroatom containing monomers, as well as polymers of olefin monomers only. (The term vinyl terminated polymers includes vinyl terminated oligomers.) Preferred vinyl terminated polyolefins include vinyl terminated isotactic polypropylene (preferably having a melting point of 100° C. or more, preferably 155° C. or more), polyethylene (preferably having a melting point of 100° C. or more, preferably 155° C. or more).

Process to Make Vinyl Terminated Oligomers

The oligomers described above are typically prepared in a homogeneous process, preferably a bulk process as described in U.S. Ser. No. 12/143,663, filed on Jun. 20, 2008, which is incorporated by reference herein. In a preferred embodiment, propylene and optional comonomers (such as ethylene) can be oligomerized by reacting a catalyst system (comprising metallocene compound(s), and one or more activators) with the olefins. Other additives may also be used, as desired, such as scavengers and/or hydrogen. Any conventional suspension, homogeneous bulk, solution, slurry, or high-pressure oligomerization process can be used. Such processes can be run in a batch, semi-batch, or continuous mode. Such processes and modes are well known in the art. Homogeneous polymerization processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 volume % or more.) Alternately no solvent or diluent is present or added in the reaction medium (except for the small amounts used as the carrier for the catalyst system or other additives, or amounts typically found with the monomer; e.g. propane in propylene).

Suitable diluents/solvents for oligomerization include non-coordinating, inert liquids. Examples include straight and branched-chain hydrocarbons such as isobutane, butane, pentane, isopentane, hexanes, isohexane, heptane, octane, dodecane, and mixtures thereof; cyclic and alicyclic hydrocarbons such as cyclohexane, cycloheptane, methylcyclohexane, methylcycloheptane, and mixtures thereof such as can be found commercially (Isopars); perhalogenated hydrocarbons such as perfluorinated $C_{4-10}$ alkanes, chlorobenzene, and aromatic and alkyl substituted aromatic compounds such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, and 1-decene. Mixtures of the foregoing are also suitable.

In a preferred embodiment, the feed concentration for the oligomerization is 60 volume % solvent or less, preferably 40 volume % or less, preferably 20 volume % or less. Preferably the oligomerization is run in a bulk process.

Suitable additives to the oligomerization process can include one or more scavengers, promoters, modifiers, reducing agents, oxidizing agents, hydrogen, aluminum alkyls, or silanes.

In a preferred embodiment hydrogen is present in the oligomerization reactor at a partial pressure of 0.001 to 50 psig, preferably from 0.01 to 25 psig, more preferably 0.1 to 10 psig. It has been found that in the present systems, hydrogen can be used to provide increased activity without significantly impairing the catalyst's ability to produce allylic chain ends. Preferably the catalyst activity (calculated as g/mmolcatalyst/hr) is at least 20% higher than the same reaction without hydrogen present, preferably at least 50% higher, preferably at least 100% higher.

In an alternate embodiment, the productivity at least 4500 g/mmol/hour, preferably 5000 or more g/mmol/hour, preferably 10,000 or more g/mmol/hr, preferably 50,000 or more g/mmol/hr.

In an alternate embodiment, the productivity is at least 80,000 g/mmol/hr, preferably at least 150,000 g/mmol/hr, preferably at least 200,000 g/mmol/hr, preferably at least 250,000 g/mmol/hr, preferably at least 300,000 g/mmol/hr.

Preferred oligomerizations can be run at typical temperatures and/or pressures, such as from 25 to 150° C., preferably 40 to 120° C., preferably 45 to 80° C., and preferably from 0.35 to 10 MPa, preferably from 0.45 to 6 MPa, preferably from 0.5 to 4 MPa.

In a typical oligomerization, the residence time of the reaction is up to 60 minutes, preferably between 5 to 50 minutes, preferably 10 to 40 minutes.

Catalyst Compound to Make Vinyl Terminated Oligomers

Catalyst compounds useful herein to produce the vinyl terminated oligomers include one or more metallocene compound(s) represented by the formulae:

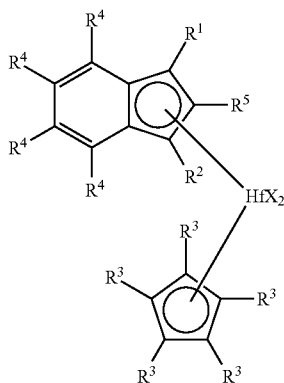

I

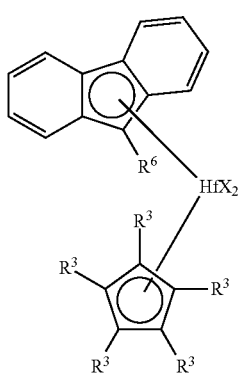

II

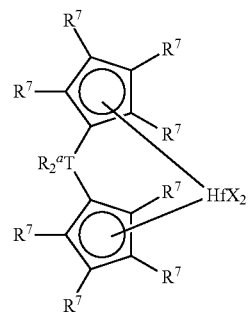

III

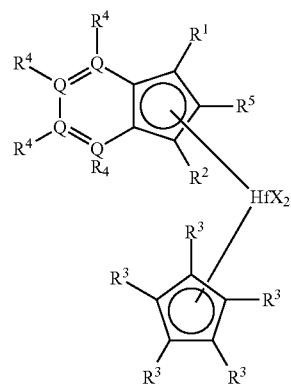

IV where
Hf is hafnium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system);
each Q is, independently carbon or a heteroatom, preferably C, N, P, S (preferably at least one Q is a heteroatom, alternately at least two Q's are the same or different heteroatoms, alternately at least three Q's are the same or different heteroatoms, alternately at least four Q's are the same or different heteroatoms);
each $R^1$ is, independently, hydrogen or a $C_1$ to $C_8$ alkyl group, preferably a $C_1$ to $C_8$ linear alkyl group, preferably methyl ethyl, propyl, butyl, pentyl, hexyl, heptyl or octyl, $R^1$ may the same or different as $R^2$;
each $R^2$ is, independently, hydrogen or a $C_1$ to $C_8$ alkyl group, preferably a $C_1$ to $C_8$ linear alkyl group, preferably methyl ethyl, propyl, butyl, pentyl, hexyl, heptyl or octyl, provided that at least one of $R^1$ or $R^2$ is not hydrogen, preferably both of $R^1$ and $R^2$ are not hydrogen, preferably $R^1$ and/or $R^2$ are not branched;
each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that at least three $R^3$ groups are not hydrogen (alternately four $R^3$ groups are not hydrogen, alternately five $R^3$ groups are not hydrogen); {Alternately, when the catalyst compound is to used to make the homo-oligomer then each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that: 1) all five $R^3$ groups are methyl, or 2) four $R^3$ groups are not hydrogen and at least one $R^3$ group is a $C_2$ to $C_8$ substituted or unsubstituted hydrocarbyl (preferably at least two, three, four or five $R^3$ groups are a $C_2$ to $C_8$ substituted or unsubstituted hydrocarbyl)};

each $R^4$ is, independently, hydrogen or a substituted or unsubstituted hydrocarbyl group, a heteroatom or heteroatom containing group, preferably a substituted or unsubstituted hydrocarbyl group having from 1 to 20 carbon atoms, preferably 1 to 8 carbon atoms, preferably a substituted or unsubstituted $C_1$ to $C_8$ linear alkyl group, preferably methyl ethyl, propyl, butyl, pentyl, hexyl, heptyl, octyl, substituted phenyl (such as propyl phenyl), phenyl, silyl, substituted silyl, (such as $CH_2SiR'$, where R' is a $C_1$ to $C_{12}$ hydrocarbyl, such as methyl, ethyl, propyl, butyl, phenyl);

$R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;

$R^6$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;

each $R^7$ is, independently, hydrogen, or a $C_1$ to $C_8$ alkyl group, preferably a $C_1$ to $C_8$ linear alkyl group, preferably methyl ethyl, propyl, butyl, pentyl, hexyl, heptyl or octyl, provided however that at least seven $R^7$ groups are not hydrogen, alternately at least eight $R^7$ groups are not hydrogen, alternately all $R^7$ groups are not hydrogen, (preferably the $R^7$ groups at the 3 and 4 positions on each Cp ring of Formula IV are not hydrogen);

N is nitrogen;

T is a bridge, preferably, Si or Ge, preferably Si;

each $R^a$, is independently, hydrogen, halogen or a C1 to C20 hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated, or saturated cyclic or fused ring system;

and further provided that any two adjacent R groups may form a fused ring or multicenter fused ring system where the rings may be aromatic, partially saturated or saturated.

The term "substituted" means that a hydrogen group has been replaced with a hydrocarbyl group, a heteroatom or a heteroatom containing group. For example methyl cyclopentadiene (Cp) is a Cp group substituted with a methyl group and ethyl alcohol is an ethyl group substituted with an —OH group.

In an alternate embodiment, at least one $R^4$ group is not hydrogen, alternately at least two $R^4$ groups are not hydrogen, alternately at least three $R^4$ groups are not hydrogen, alternately at least four $R^4$ groups are not hydrogen, alternately all $R^4$ groups are not hydrogen.

Catalyst compounds that are particularly useful in this invention include one or more of:

(1,3-Dimethylindenyl)(pentamethylcyclopentadienyl)hafniumdimethyl,
(1,3,4,7-Tetramethylindenyl)(pentamethylcyclopentadienyl)hafniumdimethyl,
(1,3-Dimethylindenyl)(tetramethylcyclopentadienyl)hafniumdimethyl,
(1,3-Diethylindenyl)(pentamethylcyclopentadienyl)hafniumdimethyl,
(1,3-Dipropylindenyl)(pentamethylcyclopentadienyl)hafniumdimethyl,
(1-Methyl,3-propyllindenyl)(pentamethylcyclopentadienyl)hafniumdimethyl,
(1,3-Dimethylindenyl)(tetramethylpropylcyclopentadienyl)hafniumdimethyl,
(1,2,3-Trimethylindenyl)(pentamethylcyclopentadienyl)hafniumdimethyl,
(1,3-Dimethylbenzindenyl)(pentamethylcyclopentadienyl)hafniumdimethyl,
(2,7-Bis t-butylfluorenyl)(pentamethylcyclopentadienyl)hafniumdimethyl,
(9-Methylfluorenyl)(pentamethylcyclopentadienyl)hafniumdimethyl,
(2,7,9-Trimethylfluorenyl)(pentamethylcyclopentadienyl)hafniumdimethyl,
μ-Dihydrosilyl(bis tetramethylcyclopentadienyl)hafniumdimethyl,
μ-Dihydrosilyl(bis tetramethylcyclopentadienyl)hafniumdimethyl,
μ-Dimethylsilyl(tetramethylcyclopentadienyl)(3-propyltrimethylcyclopentadienyl)hafniumdimethyl, and
μ-Dicyclopropylsilyl(bis tetramethylcyclopentadienyl)hafniumdimethyl.

In an alternate embodiment, the "dimethyl" after the transition metal in the list of catalyst compounds above is replaced with a dihalide (such as dichloride or difluoride) or a bisphenoxide, particularly for use with an alumoxane activator.

Activators and Activation Methods for Catalyst Compounds to Make Vinyl Terminated Oligomers The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio. Alternate preferred ranges include up to 500:1, alternately up to 200:1, alternately up to 100:1 alternately from 1:1 to 50:1.

Aluminum alkyl or organoaluminum compounds which may be utilized as co-activators (or scavengers) include trimethylaluminum, triethylaluminum, triisobutylaluminum, tri-n-hexylaluminum, tri-n-octylaluminum and the like.

Ionizing Activators

It is within the scope of this invention to use an ionizing or stoichiometric activator, neutral or ionic non-coordinating anion (as defined in U.S. Ser. No. 12/143,663, filed on Jun. 20, 2008) such as tri(n-butyl) ammonium tetrakis(pentafluorophenyl) borate, a tris perfluorophenyl boron metalloid precursor or a tris perfluoronapthyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators. Preferably the activator is N,N-dimethylanilinium tetrakis(perfluoronapthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronapthyl)borate, triphenylcarbenium tetrakis(perfluorobiphenyl)borate, triphenylcarbenium tetrakis(3,5-bis(trifluoromethyl)phenyl)borate, or triphenylcarbenium tetrakis(perfluorophenyl)borate. For additional activators useful herein, please see U.S. Ser. No. 12/143,663, filed on Jun. 20, 2008.

The typical NCA activator-to-catalyst-precursor ratio is a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Properties of Functionalized Oligomers

In another embodiment the functionalized (and optionally derivatized) propylene oligomers and propylene-ethylene co-oligomers ("functionalized co(oligomers)") described herein have less than 10 wt % allyl chain ends, preferably less than 8%, preferably less than 6%, preferably less than 5%, preferably less than 4%, preferably less than 3%, preferably less than 2%, preferably less than 1% (relative to total unsaturations as measured by $^1$H NMR, using the protocol described in U.S. Ser. No. 12/143,663, filed on Jun. 20, 2008).

In another embodiment the functionalized co(oligomers) described herein have less than 10% allyl chain ends, preferably less than 5%, preferably less than 1%, (relative to total unsaturations as measured by $^1$H NMR, using the protocol described in U.S. Ser. No. 12/143,663, filed on Jun. 20, 2008); and less than 10 wt % vinylidene unsaturations, preferably less than 5%, preferably less than 1%, (relative to total unsaturations as measured by $^1$H NMR); and/or less than 10% vinylene unsaturations, preferably less than 5%, preferably less than 1%, (relative to total unsaturations as measured by $^1$H NMR, using the protocol described in U.S. Ser. No. 12/143,663, filed on Jun. 20, 2008). No hydrogen or chain transfer/termination agent should be used during functionalization, derivitization or stripping (of unreacted monomer) for measurement of unsaturations.

In another embodiment, the functionalized co(oligomers) consist essentially of propylene, functional group and optionally ethylene. Alternately $C_4$ olefins (such as isobutylene, butadiene, n-butene) are substantially absent from the functionalized co(oligomers). Alternately $C_{4-20}$ olefins are substantially absent from the functionalized co(oligomers). Alternately isobutylene is substantially absent from the functionalized co(oligomers). By substantially absent is meant that the monomer is present in the oligomer/co-oligomer at 1 wt % or less, preferably at 0.5 wt % or less, preferably at 0 wt %.

In another embodiment, the number of functional groups is present at 0.60 to 1.2, alternately 0.75 to 1.1 functional groups per chain (preferably assuming that Mn has not altered by more than 15% as compared to the Mn of the oligomer or co-oligomer prior to functionalization and optional derivatization). Number of functional groups per chain=F/Mn, as determined by $^1$H NMR as follows: The instrument used is a 400 MHz Varian pulsed fourier transform NMR spectrometer equipped with a variable temperature proton detection probe operating at 120° C. The sample is dissolved in 1,1,2,2-tetrachloroethane-$d_2$ (TCE-$d_2$) or CDCl$_3$ and transferred into a 5 mm glass NMR tube. (The solvent has less than 10,000 ppm water and is free of other contaminants that could change the chemical shifts in the NMR spectrum). Acquisition parameters are pulse width=45°, acquisition delay=8 s and number of scans=120. Chemical shifts are determined relative to the residual TCE-$d_1$ signal which is set to 5.98 ppm and residual CHCl$_3$. which is set at 7.24 ppm. VRA is the normalized integrated signal intensity for the vinyls with shifts between from about 4.9 to 5.1 ppm. VRDA is the normalized integrated signal intensity for the vinylidene resonances between from about 4.65 to 4.85 ppm and the vinylene resonances at from about 5.15 to 5.6 ppm. IA is the normalized integrated signal intensities for the aliphatic region of interest between from about 0 to 2.1 ppm (IA). The number of vinyl groups/1000 Carbons (VI) is determined from the formula: (VRA*1000)/(IA+VRA+VDRA). Likewise, the number of vinylidene & vinylene groups/1000 carbons (VE) is determined from the formula: (VDRA*1000)/(IA+VRA+VDRA). VRA, VDRA and IA are the normalized integrated signal intensities in the chemical shift regions defined above. Mn is calculated assuming one unsaturated end-group per oligomer chain. Mn=(14,000 g/mol)/(VI+VE).

After the oligomer in question is functionalized it is necessary to determine the resonances/chemical shift regions of the functional group to determine % functionalization. To do so, repeat the above $^1$H NMR procedure on a clean sample of the functionalized oligomer (e.g. washed to remove unreacted materials, contaminants, etc.). Refer to "The Sadtler Guide to NMR Spectra", ed. William Walter Simons, published by the Sadtler Research Laboratories, 1972 for assistance in determining the shift regions for specific functional groups. The number of functional groups/1000 C's (F)=(FA*1000)/(FA+IA+VRA+VDRA), where FA=normalized integrated signal intensities in the chemical shift region of the functional group, and IA, VRA, VDRA are as defined above.

Percent functionalization of the oligomer=(F*100)/(F+VI+VE). The number of vinyl groups/1000 carbons (VI*) and number of vinylidene groups/1000 carbons (VE*) for the functionalized oligomer are determined from the $^1$HNMR spectra of the functionalized oligomer in the same manner as VI and VE for the unfunctionalized oligomer. Preferably the percent functionalization of the oligomer is 75% or more, preferably 80% or more, preferably 90% or more, preferably 95% or more.

In a preferred embodiment, F+VI*+VE*≥(0.50(VI+VE)), preferably F+VI*+VE*≥(0.60(VI+VE)), preferably F+VI*+VE*≥(0.70(VI+VE)), preferably F+VI*+VE*≥(0.75(VI+VE)), preferably F+VI*+VE*≥(0.80(VI+VE)), preferably F+VI*+VE*≥(0.85(VI+VE)), preferably F+VI*+VE*≥(0.90(VI+VE)), preferably F+VI*+VE*≥(0.95(VI+VE)), preferably F+VI*+VE*≥(0.98(VI+VE)), preferably F+VI*+VE*≥(0.99(VI+VE)).

In another embodiment, the functionalized co(oligomers) are represented by the formula:

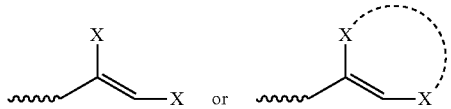

where ~~~~~ represents oligomer or co-oligomer
X is H or a functional group, provided at least one X is a functional group. Useful functional groups include any of the functional groups described above. Preferred functional groups include heteroatom containing groups where the heteroatom comprises Si, P, O, S, N, Br, Cl, F, I and or Br (preferably N, O, Cl and or Br, preferably N and or O). Particularly preferred functional groups are selected from the group consisting of acids, esters, anhydrides, acid-esters, oxycarbonyls, carbonyls, formyls, formylcarbonyls, hydroxyls, and acetyl halides. Particularly preferred functional groups include those represented by the formula: —C(O)—X*, where the O is double bonded to the C and the X* is hydrogen, nitrogen, hydroxy, oxyhydrocarbyl (e.g. ester), oxygen, the salt moiety —OM wherein M is a metal, e.g. alkali, alkaline earth, transition metal, copper, zinc and the like, oxyhetero, e.g. —O—Z wherein Z represents a heteroatom such as phosphorus boron, sulfur, which heteroatom may be substituted with hydrocarbyl or oxyhydrocarbyl groups, or two acyl groups may be joined through (X*).

Preferred functional groups include acyl groups derived from monounsaturated mono- or dicarboxylic acids and their derivatives, e.g. esters and salts.

More specifically, oligomer functionalized with mono- or dicarboxylic acid material, i.e., acid, anhydride, salt or acid ester are preferred, including the reaction product of the oligomer with a monounsaturated carboxylic reactant comprising at least one member selected from the group consisting of (i) monounsaturated $C_4$ to $C_{10}$ dicarboxylic acid (preferably wherein (a) the carboxyl groups are vicinyl, (i.e. located on adjacent carbon atoms) and (b) at least one, preferably both, of said adjacent carbon atoms are part of said monounsaturation); (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated to the carboxyl group, i.e., of the structure —C=C—C(O)— (where O is double bonded to C), and (iv) derivatives of (iii) such as $C_1$ to $C_5$ alcohol derived monoesters of (iii).

Suitable unsaturated acid materials thereof which are useful functional groups, include acrylic acid, crotonic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, crotonic acid, methylcrotonic acid, sorbic acid, 3-hexenoic acid, 10-decenoic acid, 2-pentene-1,3,5-tricarboxylic acid, cinnamic acid, and lower alkyl (e.g. $C_1$ to $C_4$ alkyl) acid esters of the foregoing, e.g. methyl maleate, ethyl fumarate, methyl fumarate, etc. Particularly preferred are the unsaturated dicarboxylic acids and their derivatives, especially maleic acid, fumaric acid and maleic anhydride.

Preferably at least 90 wt % of the functionalized or derivatized propylene oligomers or propylene-ethylene co-oligomers are represented by one or both of the above formulae, alternately at least 95 wt %, alternately at least 98 wt %, based upon the weight of the functionalized or derivatized propylene oligomers or propylene-ethylene co-oligomers.

In another embodiment this invention relates to:
1. A process to functionalize propylene co-oligomer comprising contacting an alkene metathesis catalyst with a heteroatom containing alkene and a propylene co-oligomer having an Mn of 300 to 30,000 g/mol (as measured by $^1$H NMR) comprising 10 to 90 mol % propylene and 10 to 90 mol % of ethylene, wherein the oligomer has at least X % allyl chain ends (relative to total unsaturations), where: 1) X=(−0.94 (mol % ethylene incorporated)+100), when 10 to 60 mol % ethylene is present in the co-oligomer, and 2) X=45, when greater than 60 and less than 70 mol % ethylene is present in the co-oligomer, and 3) X=(1.83*(mol % ethylene incorporated)−83), when 70 to 90 mol % ethylene is present in the co-oligomer.

2. The process of paragraph 1 wherein the oligomer has more than 90% allyl chain ends (relative to total unsaturations).

3. The process of paragraph 1 wherein the oligomer comprises 15 to 95 wt % ethylene and has more than 80% allyl chain ends (relative to total unsaturations).

4. The process of paragraph 1 wherein the oligomer comprises at 30 to 95 wt % ethylene and has more than 70% allyl chain ends (relative to total unsaturations).

5. The process of paragraph 1 wherein the oligomer comprises at 30 to 95 wt % ethylene and has more than 90% allyl chain ends (relative to total unsaturations).

6. A process to functionalize propylene oligomer comprising contacting an alkene metathesis catalyst with a heteroatom containing alkene and a propylene oligomer comprising more than 90 mol % propylene and less than 10 mol % ethylene, wherein the oligomer has: at least 93% allyl chain ends, an Mn of about 500 to about 20,000 g/mol (as measured by $^1$H NMR), an isobutyl chain end to allylic vinyl group ratio of 0.8:1 to 1.35:1.0, and less than 1400 ppm aluminum.

7. A process to functionalize propylene oligomer comprising contacting an alkene metathesis catalyst with a heteroatom containing alkene and a propylene oligomer comprising at least 50 mol % propylene and from 10 to 50 mol % ethylene, wherein the oligomer has: at least 90% allyl chain ends, Mn of about 150 to about 10,000 g/mol (as measured by $^1$H NMR), and an isobutyl chain end to allylic vinyl group ratio of 0.8:1 to 1.3:1.0, wherein monomers having four or more carbon atoms are present at from 0 to 3 mol %.

8. A process to functionalize propylene oligomer comprising contacting an alkene metathesis catalyst with a heteroatom containing alkene and a propylene oligomer comprising at least 50 mol % propylene, from 0.1 to 45 mol % ethylene, and from 0.1 to 5 mol % C4 to C12 olefin, wherein the oligomer has: at least 87% allyl chain ends (alternately at least 90%), an Mn of about 150 to about 10,000 g/mol, (as measured by $^1$H NMR), and an isobutyl chain end to allylic vinyl group ratio of 0.8:1 to 1.35:1.0.

9. A process to functionalize propylene oligomer comprising contacting an alkene metathesis catalyst with a heteroatom containing alkene and a propylene oligomer comprising at least 50 mol % propylene, from 0.1 to 45 wt % ethylene, and from 0.1 to 5 mol % diene, wherein the oligomer has: at least 90% allyl chain ends, an Mn of about 150 to about 10,000 g/mol (as measured by $^1$H NMR), and an isobutyl chain end to allylic vinyl group ratio of 0.7:1 to 1.35:1.0.

10. A process to functionalize propylene homooligomer comprising contacting an alkene metathesis catalyst with a heteroatom containing alkene and a homooligomer comprising propylene, wherein the oligomer has: at least 93% allyl chain ends, an Mn of about 500 to about 20,000 g/mol (as measured by $^1$H NMR), an isobutyl chain end to allylic vinyl group ratio of 0.8:1 to 1.2:1.0, and less than 1400 ppm aluminum.

11. The process of any of paragraphs 1 to 10, wherein the oligomer is a liquid at 25° C.

12. The process of any of paragraphs 1 to 11, wherein the Mn is about 500 to about 7,500 g/mol, the Mw is 1,000 to about 20,000 g/mol, and the Mz is about 1400 (alternately 1700) to about 150,000 g/mol.

13. The process of any of paragraphs 1 to 12 wherein the alkene metathesis catalyst is represented by the Formula (I):

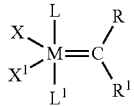

Formula (I)

where:
M is a Group 8 metal;
X and $X^1$ are, independently, any anionic ligand, or X and $X^1$ may be joined to form a dianionic group and may form single ring of up to 30 non-hydrogen atoms or a multinuclear ring system of up to 30 non-hydrogen atoms;
L and $L^1$ are neutral two electron donors, L and $L^1$ may be joined to form a single ring of up to 30 non-hydrogen atoms or a multinuclear ring system of up to 30 non-hydrogen atoms;
L and X may be joined to form a bidentate monoanionic group and may form single ring of up to 30 non-hydrogen atoms or a multinuclear ring system of up to 30 non-hydrogen atoms;
$L^1$ and $X^1$ may be joined to form a multidentate monoanionic group and may form single ring of up to 30 non-hydrogen atoms or a multinuclear ring system of up to 30 non-hydrogen atoms;
R and $R^1$ are, independently, hydrogen or $C_1$ to $C_{30}$ substituted or unsubstituted hydrocarbyl;
$R^1$ and $L^1$ or $X^1$ may be joined to form single ring of up to 30 non-hydrogen atoms or a multinuclear ring system of up to 30 non-hydrogen atoms; and
R and L or X may be joined to form single ring of up to 30 non-hydrogen atoms or a multinuclear ring system of up to 30 non-hydrogen atoms.

14. The process of paragraph 13 wherein M is Ru or Os;
X and $X^1$ are, independently, a halogen, an alkoxide or a triflate, or X and $X^1$ may be joined to form a dianionic group and may form single ring of up to 30 non-hydrogen atoms or a multinuclear ring system of up to 30 non-hydrogen atoms;
L and $L^1$ are, independently, a phosphine or a N-heterocyclic carbene, L and $L^1$ may be joined to form a single ring of up to 30 non-hydrogen atoms or a multinuclear ring system, of up to 30 non-hydrogen atoms;
L and X may be joined to form a multidentate monoanionic group and may form single ring of up to 30 non-hydrogen atoms or a multinuclear ring system of up to 30 non-hydrogen atoms;
$L^1$ and $X^1$ may be joined to form a multidentate monoanionic group and may form single ring of up to 30 non-hydrogen atoms or a multinuclear ring system of up to 30 non-hydrogen atoms;
R and $R^1$ are, independently, hydrogen or a $C_1$ to $C_{30}$ substituted or unsubstituted alkyl or a substituted or unsubstituted $C_4$ to $C_{30}$ aryl;
$R^1$ and $L^1$ or $X^1$ may be joined to form single ring of up to 30 non-hydrogen atoms or a multinuclear ring system of up to 30 non-hydrogen atoms; and
R and L or X may be joined to form single ring of up to 30 non-hydrogen atoms or a multinuclear ring system of up to 30 non-hydrogen atoms.

15. The process of any of paragraphs 1 to 14 wherein the alkene metathesis catalyst is one or more of: 2,6-Diisopropylphenylimidoneophylidene molybdenum(VI)bis(t-butoxide), 2,6-Diisopropylphenylimidoneophylidene molybdenum(VI)bis(hexafluoro-t-butoxide), 2,6-Diisopropylphenylimidoneophylidenemolybdenum(VI)bis (trifluoromethanesulfonate)dimethoxyethane adduct, 2,6-Diisopropylphenylimidoneophylidene[racemic-BIPHEN]molybdenum(VI), tricyclohexylphosphine[1,3-bis(2,4,6-trimethylphenyl)imidazol-2-ylidene][3-phenyl-1H-inden-1-ylidene]ruthenium(II)dichloride, tricyclohexylphosphine[3-phenyl-1H-inden-1-ylidene][1,3-bis(2,4,6-trimethylphenyl)-4,5-dihydro-imidazol-2-ylidene]ruthenium(II)dichloride, tricyclohexylphosphine[1,3-bis(2,4,6-trimethylphenyl)-4,5-dihydroimidazol-2-ylidene][(phenylthio)methylene]ruthenium(II)dichloride, bis(tricyclohexylphosphine)-3-phenyl-1H-inden-1-ylideneruthenium(II)dichloride, 1,3-Bis(2,4,6-trimethylphenyl)-4,5-dihydroimidazol-2-ylidene[2-(1-propoxy)-5-(N,N-dimethylaminosulfonyl)phenyl]methyleneruthenium(II)dichloride, and [1,3-Bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride, benzylidene-bis (tricyclohexylphosphine)dichlororuthenium, benzylidene[1,3-bis(2,4,6-trimethylphenyl)-2-imidazolidinylidene]dichloro(tricyclohexylphosphine)ruthenium, dichloro(o-isopropoxyphenylmethylene)(tricyclohexylphosphine)ruthenium(II), (1,3-Bis-(2,4,6-trimethylphenyl)-2-imidazolidinylidene)dichloro(o-isopropoxyphenylmethylene)ruthenium, 1,3-Bis(2-methylphenyl)-2-imidazolidinylidene]dichloro(2-isopropoxyphenylmethylene)ruthenium(II), [1,3-Bis(2,4,6-trimethylphenyl)-2-imidazolidinylidene]dichloro[3-(2-pyridinyl)propylidene]ruthenium(II), [1,3-Bis(2-methylphenyl)-2-imidazolidinylidene]dichloro (phenylmethylene) (tricyclohexylphosphine)ruthenium(II), [1,3-Bis(2,4,6-trimethylphenyl)-2-imidazolidinylidene]dichloro(3-methyl-2-butenylidene)(tricyclohexylphosphine) ruthenium(II), and [1,3-Bis(2,4,6-trimethylphenyl)-2-imidazolidinylidene]dichloro(benzylidene)bis(3-bromopyridine) ruthenium(II).

16. The process of any of paragraphs 1 to 15 wherein the heteroatom containing alkene is represented by the formula: $H_2C=CH-R$ or $R*-HC=CH-R$, where R* and R are, independently, a heteroatom containing group containing 1 to 30 carbon atoms and at least one heteroatom.

17. The process of paragraph 16 where R* and R are, independently, a heteroatom containing group containing 1 to 30 carbon atoms and at least one heteroatom selected from the group consisting of Si, P, O, S, N, Cl, F, I and Br.

18. The process of paragraph 16 where R* and R are selected from the group consisting of alcohols, amides, nitriles, imines, haloalkyls, acids, esters, anhydrides, acid-esters, oxycarbonyls, carbonyls, formyls, formylcarbonyls, hydroxyls, and acetyl halides.

19. The process of paragraph 16 where R* and R are represented by the formula -D-Y, where D is a hydrocarbyl group having 1 to 12 carbon atoms and Y is nitrogen or oxygen.

20. The process of any of paragraphs 1 to 15 wherein the heteroatom containing alkene comprises one or more of acrylonitrile, acrylamide, allyl amine, acrylic acid, crotonic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, crotonic acid, methylcrotonic acid, sorbic acid, 3-hexenoic acid, 10-decenoic acid, 2-pentene-1, 3,5-tricarboxylic acid, cinnamic acid, and lower alkyl (e.g. $C_1$ to $C_4$ alkyl) acid esters of the foregoing, e.g. methyl maleate, ethyl fumarate, methyl fumarate, 5-hexen-1-ol.

21. The process of paragraphs 1 to 20 wherein the propylene co-oligomer is prepared by a process having productivity of at least $4.5 \times 10^3$ g/mmol/hr, comprising:

contacting, at a temperature of from 35° C. to 150° C., propylene, 0.1 to 70 mol % ethylene and from 0 to about 5 wt % hydrogen in the presence of a catalyst system comprising an activator and at least one metallocene compound represented by the formulae:

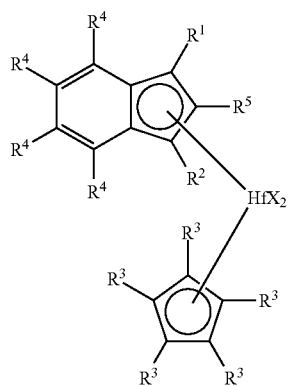

I

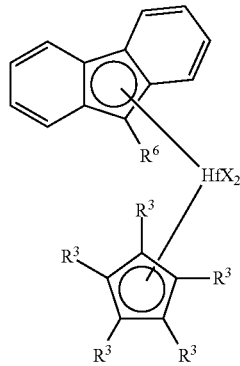

II

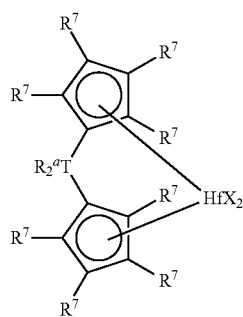

III

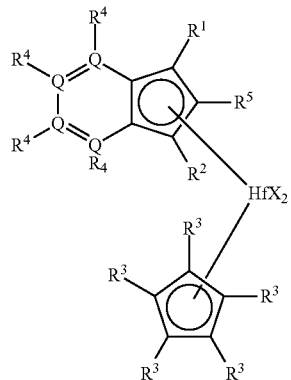

IV where
Hf is hafnium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system);
each Q is, independently carbon or a heteroatom, preferably C, N, P, S (preferably at least one Q is a heteroatom, alternately at least two Q's are the same or different heteroatoms, alternately at least three Q's are the same or different heteroatoms, alternately at least four Q's are the same or different heteroatoms);
each $R^1$ is, independently, a $C_1$ to $C_8$ alkyl group, preferably a $C_1$ to $C_8$ linear alkyl group, preferably methyl ethyl, propyl, butyl, pentyl, hexyl, heptyl or octyl, $R^1$ may the same or different as $R^2$;
each $R^2$ is, independently, a $C_1$ to $C_8$ alkyl group, preferably a $C_1$ to $C_8$ linear alkyl group, preferably methyl ethyl, propyl, butyl, pentyl, hexyl, heptyl or octyl, preferably $R^1$ and/or $R^2$ are not branched;
each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that at least three $R^3$ groups are not hydrogen (alternately four $R^3$ groups are not hydrogen, alternately five $R^3$ groups are not hydrogen);
each $R^4$ is, independently, hydrogen or a substituted or unsubstituted hydrocarbyl group, a heteroatom or heteroatom containing group, preferably a substituted or unsubstituted hydrocarbyl group having from 1 to 20 carbon atoms, preferably 1 to 8 carbon atoms, preferably a substituted or unsubstituted $C_1$ to $C_8$ linear alkyl group, preferably methyl ethyl, propyl, butyl, pentyl, hexyl, heptyl, octyl, substituted phenyl (such as propyl phenyl), phenyl, silyl, substituted silyl, (such as $CH_2SiR'$, where R' is a $C_1$ to $C_{12}$ hydrocarbyl, such as methyl, ethyl, propyl, butyl, phenyl);
$R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;
$R^6$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;
each $R^7$ is, independently, hydrogen, or a $C_1$ to $C_8$ alkyl group, preferably a $C_1$ to $C_8$ linear alkyl group, preferably methyl ethyl, propyl, butyl, pentyl, hexyl, heptyl or octyl, provided however that at least seven $R^7$ groups are not hydrogen, alternately at least eight $R^7$ groups are not hydrogen, alternately all $R^7$ groups are not hydrogen, (preferably the $R^7$ groups at the 3 and 4 positions on each Cp ring of Formula IV are not hydrogen);

N is nitrogen;

T is a bridge, preferably, Si or Ge, preferably Si;

each $R^a$, is independently, hydrogen, halogen or a C1 to C20 hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated, or saturated cyclic or fused ring system;

and further provided that any two adjacent R groups may form a fused ring or multicenter fused ring system where the rings may be aromatic, partially saturated or saturated.

22. The process of paragraphs 1 to 20 wherein the propylene homo-oligomer is prepared by a homogeneous process having productivity of at least $4.5 \times 10^6$ g/mmol/hr, comprising:

contacting, at a temperature of from 30° C. to 120° C., propylene, 0 mol % comonomer and from 0 to about 5 wt % hydrogen in the presence of a catalyst system comprising an activator and at least one metallocene compound represented by the formulae:

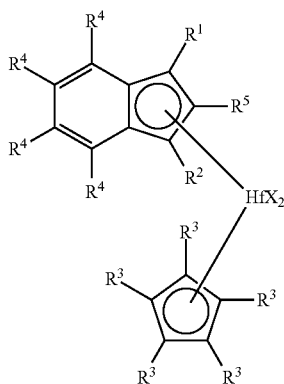

I

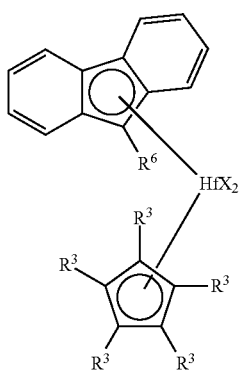

II

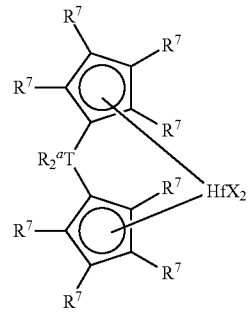

III

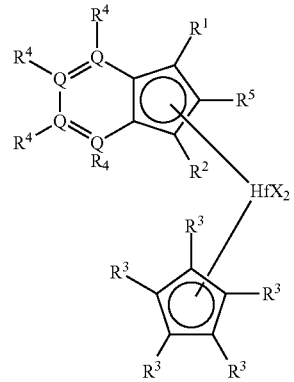

IV where

Hf is hafnium;

each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system);

each Q is, independently carbon or a heteroatom, preferably C, N, P, S (preferably at least one Q is a heteroatom, alternately at least two Q's are the same or different heteroatoms, alternately at least three Q's are the same or different heteroatoms, alternately at least four Q's are the same or different heteroatoms);

each $R^1$ is, independently, a $C_1$ to $C_8$ alkyl group, preferably a $C_1$ to $C_8$ linear alkyl group, preferably methyl ethyl, propyl, butyl, pentyl, hexyl, heptyl or octyl, $R^1$ may the same or different as $R^2$;

each $R^2$ is, independently, a $C_1$ to $C_8$ alkyl group, preferably a $C_1$ to $C_8$ linear alkyl group, preferably methyl ethyl, propyl, butyl, pentyl, hexyl, heptyl or octyl, preferably $R^1$ and/or $R^2$ are not branched;

each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that: 1) all five $R^3$ groups are methyl, or 2) four $R^3$ groups are not hydrogen and at least one $R^3$ group is a $C_2$ to $C_8$ substituted or unsubstituted hydrocarbyl (preferably at least two, three, four or five $R^3$ groups are a $C_2$ to $C_8$ substituted or unsubstituted hydrocarbyl);

each $R^4$ is, independently, hydrogen or a substituted or unsubstituted hydrocarbyl group, a heteroatom or heteroatom containing group, preferably a substituted or unsubstituted hydrocarbyl group having from 1 to 20 carbon atoms, preferably 1 to 8 carbon atoms, preferably a substituted or unsubstituted $C_1$ to $C_8$ linear alkyl group, preferably methyl ethyl, propyl, butyl, pentyl, hexyl, heptyl, octyl, substituted phenyl (such as propyl phenyl), phenyl, silyl, substituted silyl, (such as $CH_2SiR'$, where R' is a $C_1$ to $C_{12}$ hydrocarbyl, such as methyl, ethyl, propyl, butyl, phenyl);

$R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;

$R^6$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;

each $R^7$ is, independently, hydrogen, or a $C_1$ to $C_8$ alkyl group, preferably a $C_1$ to $C_8$ linear alkyl group, preferably methyl ethyl, propyl, butyl, pentyl, hexyl, heptyl or octyl, provided however that at least seven $R^7$ groups are not hydrogen, alternately at least eight $R^7$ groups are not hydrogen, alternately all $R^7$ groups are not hydrogen, (preferably the $R^7$ groups at the 3 and 4 positions on each Cp ring of Formula IV are not hydrogen);

N is nitrogen;

T is a bridge, preferably, Si or Ge, preferably Si;

each $R^a$, is independently, hydrogen, halogen or a C1 to C20 hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated, or saturated cyclic or fused ring system;

and further provided that any two adjacent R groups may form a fused ring or multicenter fused ring system where the rings may be aromatic, partially saturated or saturated.

23. The process of paragraph 21 or 22, wherein the activator comprises one or more non-coordinating anions.

24. The process of any of the above paragraphs where the process is a continuous process comprising introducing monomer and catalyst system into a reactor, obtaining a reactor effluent containing vinyl terminated propylene co-oligomer or propylene homo-oligomer, optionally removing solvent, unused monomer and/or other volatiles, obtaining vinyl terminated polyolefin (such as those described herein), introducing vinyl terminated propylene co-oligomer or propylene homo-oligomer and further combining the propylene co-oligomer or propylene homo-oligomer with an alkene metathesis catalyst and heteroatom containing alkene in a reaction zone and obtaining functionalized propylene co-oligomer or propylene homo-oligomer.

25. The process of any of the above paragraphs where the co-oligomer contains less than 80 wt % of $C_4$ olefin(s).

26. A process to functionalize a vinyl containing material, comprising contacting an alkene metathesis catalyst with a heteroatom containing alkene and one or more vinyl containing materials, preferably vinyl containing polymers, preferably vinyl containing polyolefins.

27. The process of paragraph 26 wherein the alkene metathesis catalyst is as described in paragraph 13, 14 or 15.

28. The process of paragraph 26 wherein the heteroatom containing alkene is as described in paragraph 16, 17, 18, 19 or 20.

EXAMPLES

Tests and Materials

Products were characterized by $^1H$ NMR and DSC as follows:

$^1H$ NMR $^1H$ NMR data was collected at either room temperature or 120° C. (for purposes of the claims, 120° C. shall be used) in a 5 mm probe using a Varian spectrometer with a $^1$Hydrogen frequency of at least 400 MHz. Data was recorded using a maximum pulse width of 45°, 8 seconds between pulses and signal averaging 120 transients. Spectral signals were integrated and the number of unsaturation types per 1000 carbons was calculated by multiplying the different groups by 1000 and dividing the result by the total number of carbons.

DSC

Melting temperature ($T_m$) and glass transition temperature (Tg) are measured using Differential Scanning calorimetry (DSC) using commercially available equipment such as a TA Instruments 2920 DSC. Typically, 6 to 10 mg of the sample, that has been stored at room temperature for at least 48 hours, is sealed in an aluminum pan and loaded into the instrument at room temperature. The sample is equilibrated at 25° C., then it is cooled at a cooling rate of 10° C./min to −80° C. The sample is held at −80° C. for 5 min and then heated at a heating rate of 10° C./min to 25° C. The glass transition temperature is measured from the heating cycle. Alternatively, the sample is equilibrated at 25° C., then heated at a heating rate of 10° C./min to 150° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

All molecular weights are number average unless otherwise noted. All molecular weights are reported in g/mol.

The following abbreviations are used in the Examples:

Catalyst A is tricyclohexylphosphine[1,3-bis(2,4,6-trimethylphenyl)imidazol-2-ylidene][3-phenyl-1H-inden-1-ylidene]ruthenium(II)dichloride (CAS#[254972-49-1]), Catalyst B is tricyclohexylphosphine[3-phenyl-1H-inden-1-ylidene][1,3-bis(2,4,6-trimethylphenyl)-4,5-dihydro-imidazol-2-ylidene]ruthenium(II)dichloride (CAS#[536724-67-1]), MA is methyl acrylate, aPP is atactic polypropylene, iPP is isotactic polypropylene, EP is ethylene-propylene copolymer, TCE is 1,1,2,2-tetrachloroethane, h is hours, min is minutes, $M_n$ is the number average molecular weight as determined by $^1H$ NMR spectroscopy by comparison of integrals of the aliphatic region to the olefin region as determined using the protocol described in the Experimental section of U.S. Ser. No. 12/143,663, filed on Jun. 20, 2008.

Each of the specific examples described below uses a vinyl-containing reactant. These reactants are summarized in Table 1. PE1 was purchased from Fluka and is 1-octadecene (≥95.0% unsaturation). The other vinyl-terminated polyolefins were prepared according to procedures described in U.S. Ser. No. 12/143,663, filed on Jun. 20, 2008.

TABLE 1

|  | NMR-$M_n$ | % vinyls (NMR) | Tm* (° C.) | $M_n^1$ | $M_w^1$ | $M_z^1$ | Mw/Mn$^1$ |
|---|---|---|---|---|---|---|---|
| PE1 | (252) | ≥95.0 | — | — | — | — | — |
| a-PP1 | 261 | 98 | — | 98 | 198 | 431 | 2.0 |
| a-PP2 | 945 | 97 | — | 468 | 1736 | 4143 | 3.7 |
| a-PP3 | 3571 | 95 | — | 2623 | 9865 | 20228 | 3.8 |
| EP1 | 490 | 95 | — | 294 | 1292 | 9395 | 4.4 |
| EP2 | 2205 | 94 | — | 1379 | 6200 | 64135 | 4.5 |
| i-PP1 | 3789 | 88 | 78 | 3422 | 8563 | 14792 | 2.5 |
| i-PP2 | 21906 | 73 | 122 | 25120 | 52654 | 97467 | 2.1 |

Tm* is DSC second melt;
$^1$determined by GPC - units g/mol.

Example 1

Cross Metathesis Reaction of 1-Octadecene and Methyl Acrylate

1-Octadecene (2.00 mL, 6.24 mmol) and MA (1.13 mL, 12.5 mmol) were combined with hexane (14 mL) and benzene (2 mL). The homogeneous mixture was heated to gentle reflux on a heating plate kept at 73° C. Then a benzene solution of catalyst B (1.31 mL, 0.0312 mmol) was added. Vigorous gas evolution was observed within minutes. After 2 h the volatiles were removed by evaporation under a stream of nitrogen. The resulting brownish suspension was mixed with pentane (12 mL), and the mixture was passed through a short column of neutral alumina that had been slurried with pentane. The column was washed with additional pentane (30 mL). The combined organics were evaporated and dried under reduced pressure at 75° C. for 2 h to yield the ester-capped product as a low-melting, colorless solid. Yield: 1.67 g, 86.2%. $^1$H NMR spectroscopic data indicated the nearly complete (<5% vinyl present) conversion to the expected ester-capped product as a mixture of E and Z isomers (94:6 ratio).

Example 2

Cross Metathesis Reaction of Polypropylene and Methyl Acrylate

Atactic polypropylene aPP1 (2.03 g, ca. 7.78 mmol vinyls), MA (1.40 mL, 15.6 mmol) and hexane (12 mL) were combined and heated to a gentle reflux on a heating block kept at 73° C. A benzene solution of catalyst B (1.63 mL, 0.0389 mmol) was then added. Vigorous gas evolution was observed. After 2 h the volatiles were removed by evaporation under a stream of nitrogen. The resulting brownish suspension was mixed with pentane (15 mL), and the mixture was passed through a short column of neutral alumina that had been slurried with pentane. The column was washed with additional pentane (30 mL). The combined organics were evaporated and dried under reduced pressure at 75° C. for 1 h to yield the ester-capped product as a pale yellow oil. Yield: 1.55 g. $^1$H NMR spectroscopic data indicated the nearly complete (<5% vinyl present) conversion to the expected ester-capped product as a mixture of E and Z isomers (94:6 ratio).

Example 3

Cross Metathesis Reaction of Polypropylene and Methyl Acrylate

Atactic polypropylene aPP2 (2.27 g, ca. 2.40 mmol vinyls), MA (0.433 mL, 4.80 mmol) and hexane (12 mL) were combined and heated to a gentle reflux on a heating block kept at 73° C. A benzene solution of catalyst B (0.673 mL, 0.0160 mmol) was then added. Gas evolution was observed. After 2.75 h the volatiles were removed by evaporation under a stream of nitrogen. The resulting brownish suspension was mixed with pentane (15 mL), and the mixture was passed through a short column of neutral alumina that had been slurried with pentane. The column was washed with additional pentane (30 mL). The combined organics were evaporated and dried under reduced pressure at 75° C. overnight to yield the ester-capped product as a very pale yellow oil. Yield: 2.13 g. $^1$H NMR spectroscopic data indicated the nearly complete (<5% vinyl present) conversion to the expected ester-capped product as a mixture of E and Z isomers (94:6 ratio).

Example 4

Cross Metathesis Reaction of Polypropylene and Methyl Acrylate

Atactic polypropylene aPP3 (2.48 g, ca. 0.694 mmol vinyls), MA (0.250 mL, 2.78 mmol) and hexane (12 mL) were combined and heated to a gentle reflux on a heating block kept at 73° C. A benzene solution of catalyst B (0.292 mL, 0.00694 mmol) was then added. After 3.5 h the volatiles were removed by evaporation under a stream of nitrogen. The resulting brownish suspension was mixed with pentane (15 mL), and the mixture was passed through a short column of neutral alumina that had been slurried with pentane. The column was washed with additional pentane (30 mL). The combined organics were evaporated and dried under reduced pressure at 75° C. overnight to yield the ester-capped product as a very pale yellow oil. Yield: 2.32 g. $^1$H NMR spectroscopic data indicated the nearly complete (<5% vinyl present) conversion to the expected ester-capped product as a mixture of E and Z isomers (93:7 ratio).

Example 5

Cross Metathesis Reaction of Ethylene-Propylene Copolymer with Methyl Acrylate Ethylene propylene copolymer EP1 (2.44 g, ca. 4.98 mmol vinyls), MA (0.898 mL, 9.96 mmol) and hexane (10 mL) were combined and heated to a gentle reflux on a heating block kept at 73° C. A 0.0238 M solution of catalyst B (1.05 mL, 0.0249 mmol) in benzene was then added. Gas evolution was observed almost immediately. After 16 h the volatiles were removed by evaporation under a stream of nitrogen. The resulting brownish suspension was mixed with pentane (10 mL), and the mixture was passed through a short column of neutral alumina that had been slurried with pentane. The column was washed with additional pentane (20 mL). The combined organics were evaporated and dried under reduced pressure at 75° C. for 2 h to yield the ester-capped product as a very pale yellow oil. Yield: 2.36 g. $^1$H NMR spectroscopic data indicated the nearly complete (<5% vinyl present) conversion to the expected ester-capped product as a mixture of E and Z isomers (93:7 ratio). Data are summarized in Table 2.

Example 6

Cross Metathesis Reaction of Ethylene-Propylene Copolymer with Methyl Acrylate Ethylene propylene copolymer EP2 (2.26 g, ca. 1.02 mmol vinyls) and toluene (8 mL) were combined and heated to reflux for 10 min to form a homogeneous solution. The mixture was cooled slightly and hexane (3 mL) was added. The solution became cloudy. The mixture was placed on a heating block kept at 73° C. Methyl acrylate (0.185 mL, 2.05 mmol) was then added followed by a 6.42 mM solution of catalyst B (1.60 mL, 0.0102 mmol) in toluene. Gas evolution was observed. After 3.5 h the mixture was poured into methanol (70 mL) that was rapidly stirred. A white precipitate formed that was isolated on a fitted disk and washed with methanol (2×30 mL). The product was dried under reduced pressure overnight. Yield: 2.13 g. $^1$H NMR spectroscopic data indicated that most of the starting EP2 had been converted (13% vinyl present) to the expected ester-capped product as a mixture of E and Z isomers. Data are summarized in Table 2.

Example 7

Cross Metathesis Reaction of Polypropylene with Methyl Acrylate

Isotactic polypropylene iPP1 (1.26 g, ca. 0.325 mmol vinyls) and toluene (8 mL) were combined and heated to reflux for 10 min to form a homogeneous solution. The mixture was cooled slightly and hexane (3 mL) was added. The mixture was placed on a heating block kept at 73° C. Methyl acrylate (0.100 mL, 1.11 mmol) was then added followed by a 6.42 mM solution of catalyst B (0.506 mL, 0.00325 mmol) in toluene was then added. After 3.5 h the mixture was poured into methanol (70 mL) that was rapidly stirred. A white precipitate formed that was isolated on a fritted disk and washed with methanol (2×30 mL). The product was dried under reduced pressure overnight. Yield: 1.17 g. $^1$H NMR spectroscopic data indicated the nearly complete (<5% vinyl present) conversion to the expected ester-capped product as a mixture of E and Z isomers. Some vinylidene-containing starting material remained unreacted. This was found by $^1$H NMR to be 12.9% of the isolated product. Data are summarized in Table 2.

Example 8

Cross Metathesis Reaction of Polypropylene with Methyl Acrylate

Isotactic polypropylene iPP2 (0.738 g, ca. 0.0337 mmol vinyls) and toluene (8 mL) were combined and heated to reflux for 10 min to form a homogeneous solution. The mixture was cooled slightly and hexane (3 mL) was added. The mixture was placed on a heating block kept at 73° C. Methyl acrylate (0.100 mL, 1.11 mmol) was then added followed by a 6.42 mM solution of catalyst B (0.250 mL, 0.00161 mmol) in toluene was then added. After 3.5 h the mixture was poured into methanol (70 mL) that was rapidly stirred. A fibrous white precipitate formed that was isolated and washed with methanol (2×30 mL). The product was dried under reduced pressure overnight. Yield: 0.72 g. $^1$H NMR spectroscopic data indicated the nearly complete (<5% vinyl present) conversion to the expected ester-capped product as a mixture of E and Z isomers. Data are summarized in Table 2.

Example 9

Cross Metathesis Reaction of Ethylene-Propylene Copolymer with 5-Hexen-1-ol Ethylene propylene copolymer EP2 (1.65 g, ca. 0.748 mmol vinyls) and toluene (10 mL) were combined and heated to reflux for 10 min to form a homogeneous solution. The mixture was cooled to 60° C., and it became cloudy. Then 5-hexen-1-ol (0.900 mL, 8.99 mmol) and a toluene solution (2 mL) of catalyst A (0.0288 g, 0.0304 mmol) were added. After 18 h the mixture was poured into methanol (50 mL) that was rapidly stirred. A white precipitate formed that was isolated on a fritted disk and washed with methanol (2×15 mL). The product was dried under reduced pressure overnight. Yield: 1.54 g. $^1$H NMR spectroscopic data indicated the nearly complete (<5% vinyl present) conversion to the expected product. Data are summarized in Table 2.

Example 10

Cross Metathesis Reaction of 1-Octadecene and Acrylic Acid

1-Octadecene (3.26 g, 12.9 mmol) and acrylic acid (1.12 g, 15.5 mmol) were combined with $CH_2Cl_2$ (6 mL). The mixture was heated to 40° C. Then catalyst A (0.0611 g, 0.0645 mmol) in $CH_2Cl_2$ (2 mL) was added. Gas evolution was observed after several minutes. After 21 h the mixture was mixed with methanol (80 mL) and stirred well. The mixture was cooled to −15° C. for 2 h then the crystalline product was isolated on a fritted disk and washed with methanol (2×15 mL). The white solid was dried under reduced pressure. Yield: 3.30 g, 86.3%. $^1$H NMR spectroscopic data indicated that the isolated product was the expected acid-capped product as a single observed isomer, presumably the E isomer.

Example 11

Cross Metathesis Reaction of Polypropylene with Acrylic Acid

Atactic polypropylene aPP2 (1.82 g, ca. 1.93 mmol vinyls) and acrylic acid (0.194 g, 2.70 mmol) were combined with $CH_2Cl_2$ (8 mL). The mixture was heated to 40° C. Then catalyst A (0.0166 g, 0.0175 mmol) in $CH_2Cl_2$ (2 mL) was added. After about 16 h a thick red oil remained. This was mixed with pentane (20 mL) and stirred well. The resulting orange-red suspension was passed through a short column of silica gel, then neutral alumina. The combined organics were filtered and evaporated to yield a nearly colorless oil. The oil was further dried under reduced pressure. Yield: 0.71 g. $^1$H NMR spectroscopic data indicated the nearly complete (<5% vinyl present) conversion to the expected acid-capped product and a small amount (ca. 5%) of a vinylene byproduct likely the result of iPP2 homocoupling.

TABLE 2

| | $^1$H NMR polyolefin–$H_a$/$H_b$–polar(Y) | | | GPC | | | | | DSC |
|---|---|---|---|---|---|---|---|---|---|
| Ex. | $H_a$ ($C_a$) | $H_b$ ($C_b$) | Y | $M_n$** | $M_n^1$ | $M_w^1$ | $M_z^1$ | Mw/Mn$^1$ | Tm* (° C.) |
| 1 | 6.94 | 5.79 | 3.69 | 312 | — | — | — | — | |
| 2 | 6.92 | 5.79 | 3.69 | 362 | 223 | 339 | 570 | 1.52 | |
| 3 | 6.94 | 5.80 | 3.71 | 1354 | 1001 | 2103 | 4120 | 2.1 | |
| 4 | 6.95 | 5.81 | 3.72 | 5710 | 3934 | 10686 | 20701 | 2.72 | |
| 5 | 6.93 | 5.79 | 3.70 | 691 | 281 | 993 | 6311 | 3.53 | |

TABLE 2-continued

| | 1H NMR Hₐ polyolefin \\C=C/ polar(Y) Hᵦ | | | GPC | | | | | DSC |
|---|---|---|---|---|---|---|---|---|---|
| Ex. | Hₐ (Cₐ) | Hᵦ (Cᵦ) | Y | $M_n$** | $M_n^1$ | $M_w^1$ | $M_z^1$ | Mw/Mn¹ | Tm* (° C.) |
| 6 | 6.99 | 5.86 | 3.75 | 2722 | 1841 | 6937 | 44852 | 3.77 | |
| 7 | 6.98 | 5.86 | 3.76 | 4277 | 4446 | 8926 | 14863 | 2.01 | |
| 8 | 7.0 | 5.9 | 3.8 | 18690 | 22512 | 21987 | 106931 | 2.31 | |
| 9 | 5.4-5.5 | 5.4-5.5 | | 3325 | 2011 | 7386 | 62846 | 3.67 | |
| 10 | 7.07 | 5.80 | 10.90 (—OH) | 295 | — | — | — | — | |
| 11 | 7.05 | 5.81 | not obsvd. | 2892 | 756 | 1898 | 4389 | 2.51 | |

For examples 1-5, 10 and 11 solvent of CDCl₃ at room temperature was used. For examples 6-9 solvent of D₂-TCE at 120° C. was used. Tm* is DSC second melt. 1 determined by GPC - units g/mol. ** by 1H NMR All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What is claimed is:

1. A process to functionalize propylene co-oligomer comprising contacting an alkene metathesis catalyst with a heteroatom containing alkene, and a propylene co-oligomer having an Mn of 300 to 30,000 g/mol (as measured by ¹H NMR) comprising 10 to 90 mol % propylene and 10 to 90 mol % of ethylene, wherein the co-oligomer has at least X % allyl chain ends (relative to total unsaturations), where: 1) X=(−0.94* (mol % ethylene incorporated)+100), when 10 to 60 mol % ethylene is present in the co-oligomer, and 2) X=45, when greater than 60 and less than 70 mol % ethylene is present in the co-oligomer, and 3) X=(1.83*(mol % ethylene incorporated)−83), when 70 to 90 mol % ethylene is present in the co-oligomer; wherein the heteroatom containing alkene is represented by the formula: H₂C=CH—R or R*—HC=CH—R, where R* and R are, independently, a heteroatom containing group containing 1 to 30 carbon atoms and at least one heteroatom.

2. The process of claim 1 wherein the co-oligomer has more than 90% allyl chain ends (relative to total unsaturations).

3. The process of claim 1 wherein the co-oligomer comprises 15 to 95 wt % ethylene and has more than 80% allyl chain ends (relative to total unsaturations).

4. The process of claim 1 wherein the co-oligomer comprises 30 to 95 wt % ethylene and has more than 70% allyl chain ends (relative to total unsaturations).

5. The process of claim 1 wherein the co-oligomer comprises 30 to 95 wt % ethylene and has more than 90% allyl chain ends (relative to total unsaturations).

6. The process of claim 1, wherein the co-oligomer is a liquid at 25° C.

7. The process of claim 1, wherein Mn is about 500 to about 7,500 g/mol, Mw is 1,000 to about 20,000 g/mol, and Mz is about 1400 (alternately 1700) to about 150,000 g/mol.

8. The process of claim 1 where the co-oligomer contains less than 80 wt % of C₄ olefin(s).

9. The process of claim 1 wherein the co-oligomer has an Mw/Mn by GPC-DRI of 1.5 to 10.

10. The process of claim 1 where C₄ olefins are substantially absent from the functionalized co-oligomers.

11. The process of claim 1 wherein the co-oligomer has a Tg of 0° C. or less.

12. The process of claim 1 wherein the co-oligomer has a melting point of from 60 to 130° C.

13. The process of claim 1 wherein the co-oligomer has no detectable melting point by DSC following storage at 23° C. for 48 hours.

14. The process of claim 1 where C₄₋₂₀ olefins are substantially absent from the functionalized co-oligomers.

15. The process of claim 1 where the number of functional groups present on the functionalized co-oligomer is 0.60 to 1.2 functional groups per chain, assuming that Mn has not altered by more than 15% as compared to the Mn of co-oligomer prior to functionalization.

16. The process of claim 1 where the percent functionalization of the functionalized co-oligomer is 75% or more.

17. The process of claim 1, wherein the alkene metathesis catalyst is represented by the Formula (I):

Formula (I)

where:

M is a Group 8 metal;

X and X¹ are, independently, any anionic ligand, or X and X¹ may be joined to form a dianionic group and may form single ring of up to 30 non-hydrogen atoms or a multinuclear ring system of up to 30 non-hydrogen atoms;

L and L¹ are neutral two electron donors, L and L¹ may be joined to form a single ring of up to 30 non-hydrogen atoms or a multinuclear ring system of up to 30 non-hydrogen atoms;

L and X may be joined to form a bidentate monoanionic group and may form single ring of up to 30 non-hydrogen atoms or a multinuclear ring system of up to 30 non-hydrogen atoms;

L¹ and X¹ may be joined to form a multidentate monoanionic group and may form single ring of up to 30 non-hydrogen atoms or a multinuclear ring system of up to 30 non-hydrogen atoms;

R and R¹ are, independently, hydrogen or $C_1$ to $C_{30}$ substituted or unsubstituted hydrocarbyl;

R¹ and L¹ or X¹ may be joined to form single ring of up to 30 non-hydrogen atoms or a multinuclear ring system of up to 30 non-hydrogen atoms; and R and L or X may be joined to form single ring of up to 30 non-hydrogen atoms or a multinuclear ring system of up to 30 non-hydrogen atoms.

18. The process of claim 17 wherein M is Ru or Os;

X and X¹ are, independently, a halogen, an alkoxide or a triflate, or X and X¹ may be joined to form a dianionic group and may form single ring of up to 30 non-hydrogen atoms or a multinuclear ring system of up to 30 non-hydrogen atoms;

L and L¹ are, independently, a phosphine or a N-heterocyclic carbene, L and L¹ may be joined to form a single ring of up to 30 non-hydrogen atoms or a multinuclear ring system, of up to 30 non-hydrogen atoms;

L and X may be joined to form a multidentate monoanionic group and may form single ring of up to 30 non-hydrogen atoms or a multinuclear ring system of up to 30 non-hydrogen atoms;

L¹ and X¹ may be joined to form a multidentate monoanionic group and may form single ring of up to 30 non-hydrogen atoms or a multinuclear ring system of up to 30 non-hydrogen atoms;

R and R¹ are, independently, hydrogen or a $C_1$ to $C_{30}$ substituted or unsubstituted alkyl or a substituted or unsubstituted $C_4$ to $C_{30}$ aryl;

R¹ and L¹ or X¹ may be joined to form single ring of up to 30 non-hydrogen atoms or a multinuclear ring system of up to 30 non-hydrogen atoms; and R and L or X may be joined to form single ring of up to 30 non-hydrogen atoms or a multinuclear ring system of up to 30 non-hydrogen atoms.

19. The process of claim 1 wherein the alkene metathesis catalyst is one or more of:

2,6-diisopropylphenylimidoneophylidene molybdenum(VI) bis(t-butoxide), 2,6-diisopropylphenylimidoneophylidene molybdenum(VI) bis(hexafluoro-t-butoxide), 2,6-diisopropylphenylimidoneophylidene molybdenum(VI) bis(trifluoromethanesulfonate) dimethoxyethane adduct, 2,6-diisopropylphenylimidoneophylidene[racemic-BIPHEN]molybdenum(VI), tricyclohexylphosphine[1,3-bis(2,4,6trimethylphenyl)imidazol-2-ylidene][3-phenyl-1H-inden-1-ylidene] ruthenium(II)dichloride, tricyclohexylphosphine[3-phenyl-1H-inden-1-ylidene][1,3-bis(2,4,6-trimethylphenyl)-4,5-dihydro-imidazol-2-ylidene] ruthenium(II)dichloride, tricyclohexylphosphine[1,3-bis(2,4,6-trimethylphenyl)-4,5-dihydroimidazol-2-ylidene][(phenylthio)methylene]ruthenium(II) dichloride, bis(tricyclohexylphosphine)-3-phenyl-1H-inden-1-ylideneruthenium(II)dichloride, 1,3-bis(2,4,6-trimethylphenyl)-4,5-dihydroimidazol-2-ylidene[2-(1-propoxy)-5-(N,N-dimethylaminosulfonyl)phenyl]methyleneruthenium(II)dichloride, [1,3-bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride, benzylidene-bis(tricyclohexylphosphine)dichlororuthenium, benzylidene[1,3-bis(2,4,6-trimethylphenyl)-2-imidazolidinylidene]dichloro(tricyclohexylphosphine)ruthenium, dichloro(o-isopropoxyphenylmethylene)(tricyclohexylphosphine)ruthenium(II), (1,3-bis-(2,4,6-trimethylphenyl)-2-imidazolidinylidene)dichloro(o-isopropoxyphenylmethylene)ruthenium, 1,3-bis(2-methylphenyl)-2-imidazolidinylidene]dichloro(2-isopropoxyphenylmethylene)ruthenium(II), [1,3-bis(2,4,6-trimethylphenyl)-2-imidazolidinylidene]dichloro[3-(2-pyridinyl)propylidene]ruthenium(II), [1,3-bis(2-methylphenyl)-2-imidazolidinylidene]dichloro(phenylmethylene)(tricyclohexylphosphine)ruthenium(II), [1,3-bis(2,4,6-trimethylphenyl)-2-imidazolidinylidene]dichloro(3-methyl-2-butenylidene)(tricyclohexylphosphine)ruthenium(II), and [1,3-bis(2,4,6-trimethylphenyl)-2-imidazolidinylidene]dichloro(benzylidene)bis(3-bromopyridine) ruthenium(II).

20. The process of claim 1 where R* and R are, independently, a heteroatom containing group containing 1 to 30 carbon atoms and at least one heteroatom selected from the group consisting of Si, P, O, S, N, Cl, F, I and Br.

21. The process of claim 1 where R* and R are selected from the group consisting of alcohols, amides, nitriles, imines, haloalkyls, acids, esters, anhydrides, acid-esters, oxycarbonyls, carbonyls, formyls, formylcarbonyls, hydroxyls, and acetyl halides.

22. The process of claim 1 where R* and R are represented by the formula D-Y, where D is a hydrocarbyl group having 1 to 12 carbon atoms and Y is nitrogen or oxygen.

23. The process of claim 1 wherein the heteroatom containing alkene comprises one or more of acrylonitrile, acrylamide, allyl amine, acrylic acid, crotonic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, crotonic acid, methylcrotonic acid, sorbic acid, 3-hexenoic acid, 10-decenoic acid, 2-pentene-1,3,5-tricarboxylic acid, cinnamic acid, and $C_1$ to $C_4$ alkyl acid esters of the foregoing, methyl maleate, ethyl fumarate, methyl fumarate, and 5-hexen-1-ol.

24. The process of claim 1 wherein the propylene co-oligomer is prepared by a process having productivity of at least $4.5 \times 10^3$ g/mmol/hr, comprising: contacting, at a temperature of from 35° C. to 150° C., propylene, 0.1 to 70 mol % ethylene and from 0 to about 5 wt % hydrogen in the presence of a catalyst system comprising an activator and at least one metallocene compound represented by the formulae:

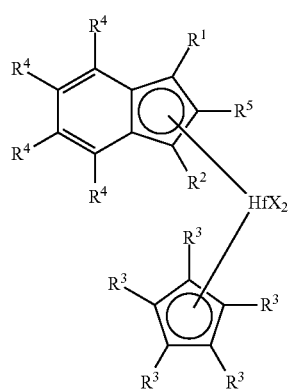

I

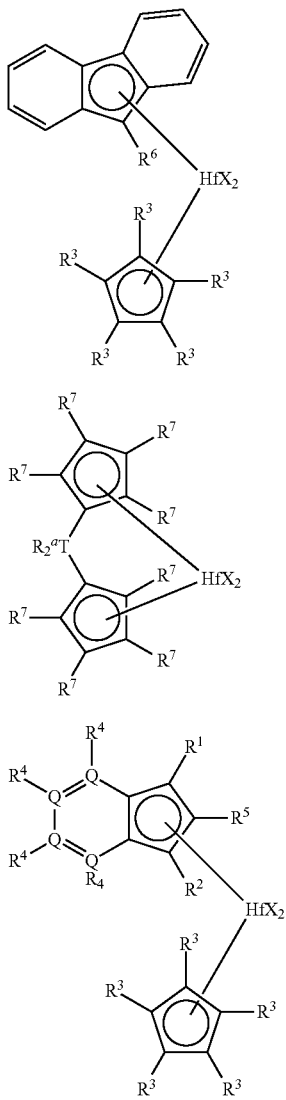

where
Hf is hafnium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, (alternately two X's may form a part of a fused ring or a ring system);
each Q is, independently carbon or a heteroatom;
each $R^1$ is, independently, a $C_1$ to $C_8$ alkyl group, $R^1$ may be the same or different as $R^2$;
each $R^2$ is, independently, a $C_1$ to $C_8$ alkyl group;
each $R^3$ is, independently, hydrogen, or a substituted or unsubstituted hydrocarbyl group having from 1 to 8 carbon atoms, provided that at least three $R^3$ groups are not hydrogen;
each $R^4$ is, independently, hydrogen or a substituted or unsubstituted hydrocarbyl group, a heteroatom or heteroatom containing group;
$R^6$ is hydrogen or a $C_1$ to $C_8$ alkyl group;
each $R^7$ is, independently, hydrogen, or a $C_1$ to $C_8$ alkyl group provided that at least seven $R^7$ groups are not hydrogen;
N is nitrogen;
T is a bridge;
each $R^a$, is independently, hydrogen, halogen or a $C_1$ to $C_{20}$ hydrocarbyl and two $R^a$ can form an aromatic, partially saturated, or saturated cyclic or fused ring system;
and further provided that any two adjacent R groups may form a fused ring or multicenter fused ring system where the rings may be aromatic, partially saturated or saturated.

25. The process of claim 24, wherein the activator comprises one or more non-coordinating anions.

26. The process of claim 1 where the process is a continuous process comprising introducing monomer and catalyst system into a reactor, obtaining a reactor effluent containing vinyl terminated propylene co-oligomer, optionally removing solvent, unused monomer and/or other volatiles, obtaining vinyl terminated propylene co-oligomer, introducing vinyl terminated propylene co-oligomer and further combining the propylene co-oligomer with an alkene metathesis catalyst and heteroatom containing alkene in a reaction zone and obtaining functionalized propylene co-oligomer.

* * * * *